US011893976B2

(12) United States Patent
Oh et al.

(10) Patent No.: US 11,893,976 B2
(45) Date of Patent: Feb. 6, 2024

(54) ELECTRONIC DEVICE AND OPERATION METHOD THEREOF

(71) Applicant: SAMSUNG ELECTRONICS CO., LTD., Suwon-si (KR)

(72) Inventors: Junkwang Oh, Suwon-si (KR); Kyounggu Woo, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 446 days.

(21) Appl. No.: 17/366,965

(22) Filed: Jul. 2, 2021

(65) Prior Publication Data

US 2022/0005459 A1 Jan. 6, 2022

Related U.S. Application Data

(63) Continuation of application No. PCT/KR2021/008184, filed on Jun. 29, 2021.

(30) Foreign Application Priority Data

Jul. 6, 2020 (KR) .................. 10-2020-0082780

(51) Int. Cl.
*G06F 40/35* (2020.01)
*G10L 13/08* (2013.01)
(Continued)

(52) U.S. Cl.
CPC .............. *G10L 13/08* (2013.01); *G06F 21/31* (2013.01); *G10L 15/22* (2013.01)

(58) Field of Classification Search
CPC .......... G06F 40/35; G06F 40/10; G06F 40/16; G06F 40/186; G06F 40/205;
(Continued)

(56) References Cited

U.S. PATENT DOCUMENTS 9,942,752 B1 4/2018 Marimuthu
10,176,796 B2 1/2019 Li et al.
(Continued)

FOREIGN PATENT DOCUMENTS

JP 2014-220725 11/2014
KR 10-2009-0100608 9/2009
(Continued)

OTHER PUBLICATIONS

Georg Heigold, et al., "End-to-End Text-Dependent Speaker Verification", Google Inc., USA, Sep. 27, 2015, 5 pages.
(Continued)

*Primary Examiner* — Qi Han
(74) *Attorney, Agent, or Firm* — Nixon & Vanderhye, P.C.

(57) ABSTRACT

According to an embodiment, an electronic device may include: a display, a communication module comprising communication circuitry, a memory; and a processor operatively connected to the display, the communication module, and the memory. According to an embodiment, the memory may store instructions that, when executed, cause the processor to control the electronic device to: obtain unique information of an external electronic device and information associated with a user of the external electronic device through the communication module, generate a candidate group including at least one candidate based on the unique information and the information associated with the user of the external electronic device, provide an external server with at least part of the information associated with the user of the external electronic device and information associated with the candidate group, receive a reliability value indicating a degree of similarity between the information associated with the user of the external electronic device and the information associated with the candidate group, from the
(Continued)

external server, and to display a user interface (UI) indicating authentication for the user of the external electronic device based on the reliability value on the display.

20 Claims, 11 Drawing Sheets

(51) Int. Cl.
*G06F 21/31* (2013.01)
*G10L 15/22* (2006.01)

(58) Field of Classification Search
CPC ...... G06F 40/211; G06F 40/253; G06F 40/30; G06F 40/56; G10L 15/22; G10L 15/06; G10L 15/063; G10L 15/065; G10L 15/07; G10L 15/08; G10L 15/16; G10L 15/18; G10L 15/26; G10L 2015/0631–0638; G10L 2015/221–228
USPC ....... 704/273, 9, 1, 10, 257, 270.1, 270.275, 704/231, 246, 250
See application file for complete search history.

(56) References Cited

U.S. PATENT DOCUMENTS

| | | | |
|---|---|---|---|
| 2016/0057565 A1* | 2/2016 | Gold | H04W 4/023 |
| | | | 455/41.1 |
| 2017/0245125 A1* | 8/2017 | Child | H04W 4/12 |
| 2018/0182386 A1* | 6/2018 | Lee | G10L 15/22 |
| 2019/0356776 A1* | 11/2019 | Walters | G10L 25/51 |
| 2020/0356647 A1 | 11/2020 | Yoon | |

FOREIGN PATENT DOCUMENTS

| | | |
|---|---|---|
| KR | 10-2010-0060302 | 6/2010 |
| KR | 10-2013-0075513 | 7/2013 |
| KR | 10-2019-0029628 | 3/2019 |
| KR | 10-2019-0048630 | 5/2019 |

OTHER PUBLICATIONS

International Search Report and Written Opinion dated Oct. 27, 2021 in corresponding International Application No. PCT/KR2021/008184.

* cited by examiner

ELECTRONIC DEVICE AND OPERATION METHOD THEREOF

CROSS-REFERENCE TO RELATED APPLICATION

This application is a continuation of PCT/KR2021/008184, filed on Jun. 29, 2021 in the Korean Intellectual Property Office which is based on and claims priority under to Korean Patent Application No. 10-2020-0082780, filed Jul. 6, 2020, in the Korean Intellectual Property Office, the disclosures of which are incorporated by reference herein in their entireties.

BACKGROUND

Field

The disclosure relates to an electronic device and an operating method thereof.

Description of Related Art

Nowadays, various electronic devices may install a text-to-speech (TTS) function that synthesizes voices, may convert a text into a voice, and may output the voice. For the purpose of providing the TTS function, an electronic device may use a TTS model including a phoneme of a text and voice data corresponding to the phoneme.

With the development of a technology of artificial intelligence (AI) in a field of voice synthesis or video synthesis technology, a technology that imitates voices of other persons or shapes of other persons is also remarkably developing. As artificial composites very similar to actual human voices or shapes increase, there is an increasing need for a technology of identifying the artificial composites.

SUMMARY

Embodiments of the disclosure provide an electronic device that determines a candidate group including candidates, each of which is estimated as a user of an external electronic device, and displays a result of authenticating the user of the external electronic device at an improved speed, based on information associated with the user of the external electronic device, and an operating method thereof.

Embodiments of the disclosure provide an electronic device that is capable of indicating whether the user of the external electronic device is an authentic user, while a call is connected, and an operating method thereof.

According to an example embodiment, an electronic device may include: a display, a communication module comprising communication circuitry, a memory; and a processor operatively connected to the display, the communication module, and the memory. According to an example embodiment, the memory may store instructions that, when executed, cause the processor to control the electronic device to: obtain unique information of an external electronic device and information associated with a user of the external electronic device through the communication module, generate a candidate group including at least one candidate based on the unique information and the information associated with the user of the external electronic device, provide an external server with at least part of the information associated with the user of the external electronic device and information associated with the candidate group, receive a reliability value indicating a degree of similarity between the information associated with the user of the external electronic device and the information associated with the candidate group from the external server, and display a user interface (UI) indicating authentication for the user of the external electronic device based on the reliability value on the display.

According to an example embodiment a method of operating an electronic device may include: obtaining unique information of an external electronic device and information associated with a user of the external electronic device through a communication module, generating a candidate group including at least one candidate based on the unique information and the information associated with the user of the external electronic device, providing an external server with at least part of the information associated with the user of the external electronic device and information associated with the candidate group, receiving a reliability value indicating a degree of similarity between the information associated with the user of the external electronic device and the information associated with the candidate group from the external server, and displaying a UI indicating authentication for the user of the external electronic device based on the reliability value on the display.

According to various example embodiments disclosed herein, it is possible to determine a candidate group including candidates, each of which is estimated as a user of an external electronic device, and to display a result of authenticating the user of the external electronic device at an improved speed, based on information associated with the user of the external electronic device.

According to various example embodiments, it is possible to display information indicating whether the user of the external electronic device is an authentic user, while a call is connected.

BRIEF DESCRIPTION OF THE DRAWINGS

The above and other aspects, features and advantages of certain embodiments of the present disclosure will be more apparent from the following detailed description, taken in conjunction with the accompanying drawings, in which.

With regard to description of drawings, the same or similar components will be marked by the same or similar reference signs.

DETAILED DESCRIPTION

Figure 1:
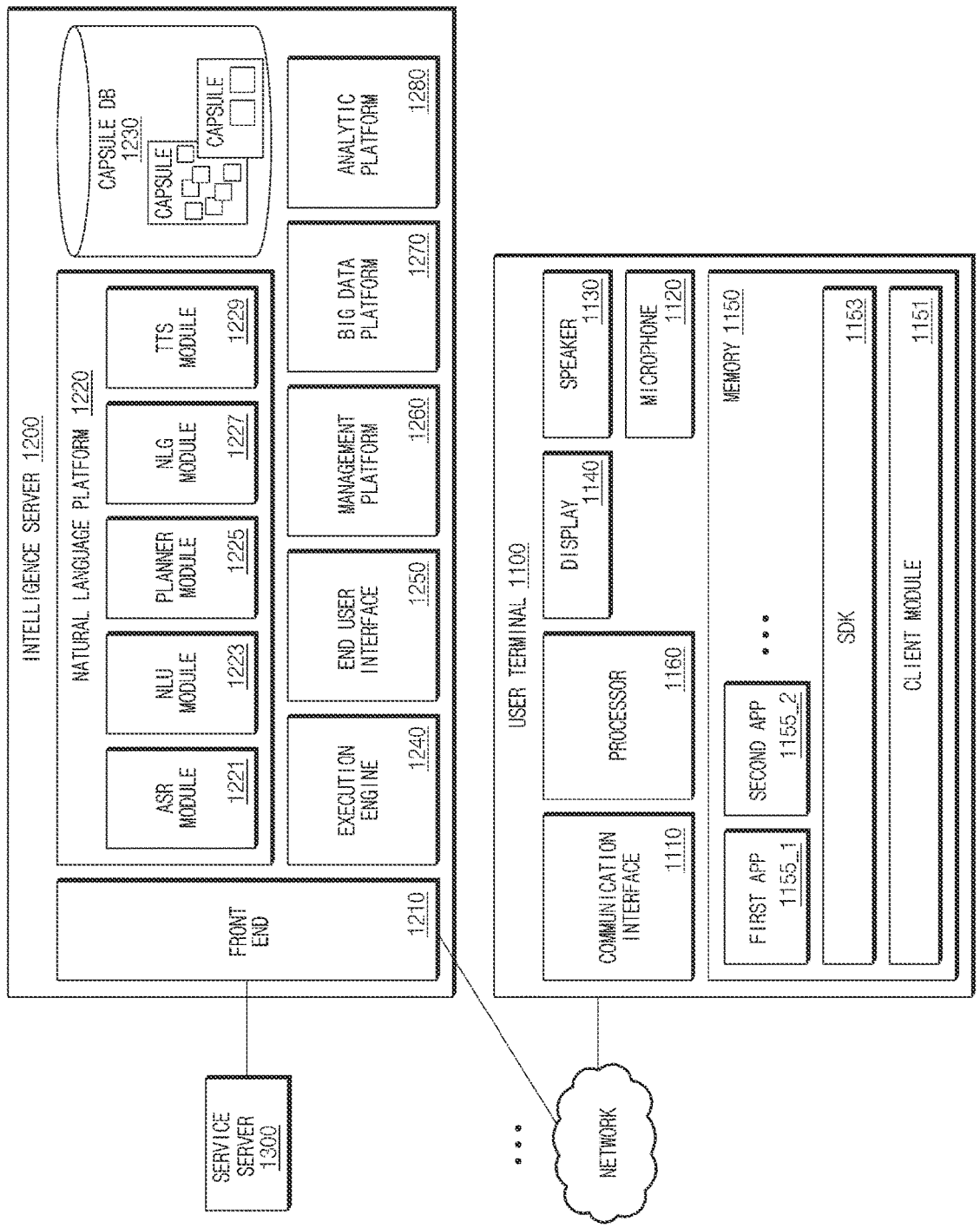
FIG. 1 is a block diagram illustrating an example integrated intelligence system, according to various embodiments.

FIG. 1 is a block diagram illustrating an example integrated intelligence system, according to various embodiments.

Referring to FIG. 1, an integrated intelligence system according to an embodiment may include a user terminal 1100, an intelligence server 1200, and a service server 1300.

The user terminal 1100 according to an embodiment may be a terminal device (or an electronic device) capable of connecting to Internet, and may be, for example, a mobile phone, a smartphone, a personal digital assistant (PDA), a notebook computer, a television (TV), a white household appliance, a wearable device, a head mounted display (HMD), or a smart speaker.

According to the illustrated embodiment, the user terminal 1100 may include a communication interface 1110, a microphone 1120, a speaker 1130, a display 1140, a memory 1150, or a processor 1160. The listed components may be operatively or electrically connected to one another.

The communication interface 1110 according to an embodiment may be connected to an external device and may be configured to transmit or receive data to or from the external device. The microphone 1120 according to an embodiment may receive a sound (e.g., a user utterance) to convert the sound into an electrical signal. The speaker 1130 according to an embodiment may output the electrical signal as sound (e.g., voice). The display 1140 according to an embodiment may be configured to display an image or a video. The display 1140 according to an embodiment may display the graphic user interface (GUI) of the running app (or an application program).

The memory 1150 according to an embodiment may store a client module 1151, a software development kit (SDK) 1153, and a plurality of apps (1155_1, 1155_2 . . . ). The client module 1151 and the SDK 1153 may include a framework (or a solution program) for performing general-purposed functions. Furthermore, the client module 1151 or the SDK 1153 may include the framework for processing a voice input.

The plurality of apps (1155_1, 1155_2 . . . ) may be a program for performing the specified function. According to an embodiment, the plurality of apps (1155_1, 1155_2 . . . ) may include a first app 1155_1 and/or a second app 1155_2 According to an embodiment, each of the plurality of apps (1155_1, 1155_2 . . . ) may include a plurality of actions for performing a specified function. For example, the apps may include an alarm app, a message app, and/or a schedule app. According to an embodiment, the plurality of apps (1155_1, 1155_2 . . . ) may be executed by the processor 1160 to sequentially execute at least part of the plurality of actions.

According to an embodiment, the processor 1160 may control overall operations of the user terminal 1100. For example, the processor 1160 may be electrically connected to the communication interface 1110, the microphone 1120, the speaker 1130, and the display 1140 to perform a specified operation. For example, the processor 1160 may include at least one processor.

Moreover, the processor 1160 according to an embodiment may execute the program stored in the memory 1150 to perform a specified function. For example, according to an embodiment, the processor 1160 may execute at least one of the client module 1151 or the SDK 1153 to perform a following operation for processing a voice input. The processor 1160 may control operations of the plurality of apps (1155_1, 1155_2 . . . ) via the SDK 1153. The following actions described as the actions of the client module 1151 or the SDK 1153 may be the actions performed by the execution of the processor 1160.

According to an embodiment, the client module 1151 may receive a voice input. For example, the client module 1151 may receive a voice signal corresponding to a user utterance detected through the microphone 1120. The client module 1151 may transmit the received voice input (e.g., a voice input) to the intelligence server 1200. The client module 1151 may transmit state information of the user terminal 1100 to the intelligence server 1200 together with the received voice input. For example, the state information may be execution state information of an app.

According to an embodiment, the client module 1151 may receive a result corresponding to the received voice input. For example, when the intelligence server 1200 is capable of calculating the result corresponding to the received voice input, the client module 1151 may receive the result corresponding to the received voice input. The client module 1151 may display the received result on the display 1140.

According to an embodiment, the client module 1151 may receive a plan corresponding to the received voice input. The client module 1151 may display, on the display 1140, a result of executing a plurality of actions of an app depending on the plan. For example, the client module 1151 may sequentially display the result of executing the plurality of actions on a display. For another example, the user terminal 1100 may display only a part of results (e.g., a result of the last action) of executing the plurality of actions, on the display.

According to an embodiment, the client module 1151 may receive a request for obtaining information necessary to calculate the result corresponding to a voice input, from the intelligence server 1200. According to an embodiment, the client module 1151 may transmit the necessary information to the intelligence server 1200 in response to the request.

According to an embodiment, the client module 1151 may transmit, to the intelligence server 1200, information about the result of executing a plurality of actions depending on the plan. The intelligence server 1200 may identify that the received voice input is correctly processed, using the result information.

According to an embodiment, the client module 1151 may include a speech recognition module. According to an embodiment, the client module 1151 may recognize a voice input for performing a limited function, via the speech recognition module. For example, the client module 1151 may launch an intelligence app for processing a specific voice input by performing an organic action, in response to a specified voice input (e.g., wake up!).

According to an embodiment, the intelligence server 1200 may receive information associated with a user's voice input from the user terminal 1100 over a communication network. According to an embodiment, the intelligence server 1200 may convert data associated with the received voice input to text data. According to an embodiment, the intelligence server 1200 may generate at least one plan for performing a task corresponding to the user's voice input, based on the text data.

According to an embodiment, the plan may be generated by an artificial intelligent (AI) system. The AI system may be a rule-based system, or may be a neural network-based system (e.g., a feedforward neural network (FNN) and/or a recurrent neural network (RNN)). Alternatively, the AI system may be a combination of the above-described systems or an AI system different from the above-described systems. According to an embodiment, the plan may be selected from a set of predefined plans or may be generated in real time in response to a user's request. For example, the AI system may select at least one plan of the plurality of predefined plans.

According to an embodiment, the intelligence server 1200 may transmit a result according to the generated plan to the user terminal 1100 or may transmit the generated plan to the user terminal 1100. According to an embodiment, the user terminal 1100 may display the result according to the plan, on a display. According to an embodiment, the user terminal 1100 may display a result of executing the action according to the plan, on the display.

The intelligence server 1200 according to an embodiment may include a front end 1210, a natural language platform 1220, a capsule database 1230, an execution engine 1240, an end user interface 1250, a management platform 1260, a big data platform 1270, or an analytic platform 1280.

According to an embodiment, the front end 1210 may receive a voice input received from the user terminal 1100. The front end 1210 may transmit a response corresponding to the voice input to the user terminal 1100.

According to an embodiment, the natural language platform 1220 may include an automatic speech recognition (ASR) module 1221, a natural language understanding (NLU) module 1223, a planner module 1225, a natural language generator (NLG) module 1227, and/or a text to speech module (TTS) module 1229.

According to an embodiment, the ASR module 1221 may convert the voice input received from the user terminal 1100 into text data. According to an embodiment, the NLU module 1223 may grasp the intent of the user, using the text data of the voice input. For example, the NLU module 1223 may grasp the intent of the user by performing syntactic analysis or semantic analysis. According to an embodiment, the NLU module 1223 may grasp the meaning of words extracted from the voice input using linguistic features (e.g., syntactic elements) such as morphemes or phrases and may determine the intent of the user by matching the grasped meaning of the words to the intent.

According to an embodiment, the planner module 1225 may generate the plan using a parameter and the intent that is determined by the NLU module 1223. According to an embodiment, the planner module 1225 may determine a plurality of domains necessary to perform a task, based on the determined intent. The planner module 1225 may determine a plurality of actions included in each of the plurality of domains determined based on the intent. According to an embodiment, the planner module 1225 may determine the parameter necessary to perform the determined plurality of actions or a result value output by the execution of the plurality of actions. The parameter and the result value may be defined as a concept of a specified form (or class). As such, the plan may include the plurality of actions and/or a plurality of concepts, which are determined by the intent of the user. The planner module 1225 may determine the relationship between the plurality of actions and the plurality of concepts stepwise (or hierarchically). For example, the planner module 1225 may determine the execution sequence of the plurality of actions, which are determined based on the user's intent, based on the plurality of concepts. In other words, the planner module 1225 may determine an execution sequence of the plurality of actions, based on the parameters necessary to perform the plurality of actions and the result output by the execution of the plurality of actions. Accordingly, the planner module 1225 may generate a plan including information (e.g., ontology) about the relationship between the plurality of actions and the plurality of concepts. The planner module 1225 may generate the plan, using information stored in the capsule DB 1230 storing a set of relationships between concepts and actions.

According to an embodiment, the NLG module 1227 may change specified information into information in a text form. The information changed to the text form may be in the form of a natural language speech. The TTS module 1229 according to an embodiment may change information in the text form to information in a voice form.

According to an embodiment, all or part of the functions of the natural language platform 1220 may be also implemented in the user terminal 1100.

The capsule DB 1230 may store information about the relationship between the actions and the plurality of concepts corresponding to a plurality of domains. According to an embodiment, the capsule may include a plurality of action objects (or action information) and concept objects (or concept information) included in the plan. According to an embodiment, the capsule DB 1230 may store the plurality of capsules in a form of a concept action network (CAN). According to an embodiment, the plurality of capsules may be stored in the function registry included in the capsule DB 1230.

The capsule DB 1230 may include a strategy registry that stores strategy information necessary to determine a plan corresponding to a voice input. When there are a plurality of plans corresponding to the voice input, the strategy information may include reference information for determining one plan. According to an embodiment, the capsule DB 1230 may include a follow-up registry that stores information of the follow-up action for suggesting a follow-up action to the user in a specified context. For example, the follow-up action may include a follow-up utterance. According to an embodiment, the capsule DB 1230 may include a layout registry storing layout information of information output via the user terminal 1100. According to an embodiment, the capsule DB 1230 may include a vocabulary registry storing vocabulary information included in capsule information. According to an embodiment, the capsule DB 1230 may include a dialog registry storing information about dialog (or interaction) with the user. The capsule DB 1230 may update an object stored via a developer tool. For example, the developer tool may include a function editor for updating an action object or a concept object. The developer tool may include a vocabulary editor for updating a vocabulary. The developer tool may include a strategy editor that generates and registers a strategy for determining the plan. The developer tool may include a dialog editor that creates a dialog with the user. The developer tool may include a follow-up editor capable of activating a follow-up target and editing the follow-up utterance for providing a hint. The follow-up target may be determined based on a target, the user's preference, or an environment condition, which is currently set. The capsule DB 1230 according to an embodiment may be also implemented in the user terminal 1100.

According to an embodiment, the execution engine 1240 may calculate a result using the generated plan. The end user interface 1250 may transmit the calculated result to the user terminal 1100. Accordingly, the user terminal 1100 may receive the result and may provide the user with the received result. According to an embodiment, the management platform 1260 may manage information used by the intelligence server 1200. According to an embodiment, the big data platform 1270 may collect data of the user. According to an embodiment, the analytic platform 1280 may manage quality of service (QoS) of the intelligence server 1200. For example, the analytic platform 1280 may manage the component and processing speed (or efficiency) of the intelligence server 1200.

According to an embodiment, the service server 1300 may provide the user terminal 1100 with a specified service (e.g., ordering food or booking a hotel). According to an embodiment, the service server 1300 may be a server operated by the third party. According to an embodiment, the service server 1300 may provide the intelligence server 1200 with information for generating a plan corresponding to the received voice input. The provided information may be stored in the capsule DB 1230. Furthermore, the service server 1300 may provide the intelligence server 1200 with result information according to the plan.

In the above-described integrated intelligence system, the user terminal 1100 may provide the user with various intelligent services in response to a user input. The user input may include, for example, an input through a physical button, a touch input, or a voice input.

According to an embodiment, the user terminal 1100 may provide a speech recognition service via an intelligence app (or a speech recognition app) stored therein. In this case, for example, the user terminal 1100 may recognize a user utterance or a voice input, which is received via the microphone, and may provide the user with a service corresponding to the recognized voice input.

According to an embodiment, the user terminal 1100 may perform a specified action, based on the received voice input, independently, or together with the intelligence server and/or the service server. For example, the user terminal 1100 may launch an app corresponding to the received voice input and may perform the specified action via the executed app.

According to an embodiment, when providing a service together with the intelligence server 1200 and/or the service server, the user terminal 1100 may detect a user utterance using the microphone 1120 and may generate a signal (or voice data) corresponding to the detected user utterance. The user terminal may transmit the voice data to the intelligence server 1200, using the communication interface 1110.

According to an embodiment, the intelligence server 1200 may generate a plan for performing a task corresponding to the voice input or the result of performing an action depending on the plan, as a response to the voice input received from the user terminal 1100. For example, the plan may include a plurality of actions for performing the task corresponding to the voice input of the user and/or a plurality of concepts associated with the plurality of actions. The concept may define a parameter to be input upon executing the plurality of actions or a result value output by the execution of the plurality of actions. The plan may include relationship information between the plurality of actions and the plurality of concepts.

According to an embodiment, the user terminal 1100 may receive the response, using the communication interface 1110. The user terminal 1100 may output the voice signal generated in the user terminal 1100 to the outside using the speaker 1130 or may output an image generated in the user terminal 1100 to the outside using the display 1140.

Figure 2:
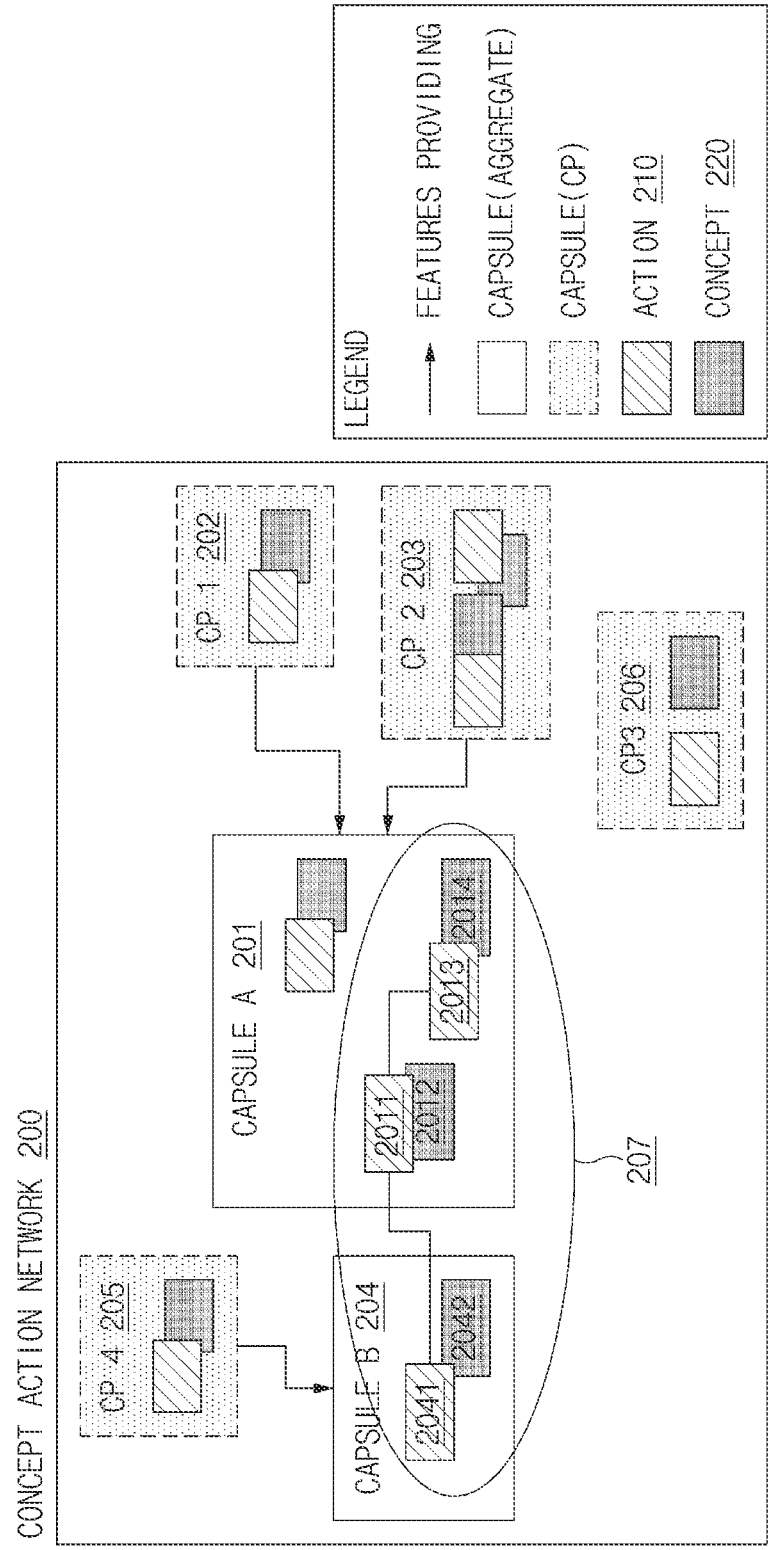
FIG. 2 is a diagram illustrating an example in which relationship information between a concept and an action is stored in a database, according to various embodiments.

FIG. 2 is a diagram illustrating an example in which relationship information between a concept and an action is stored in a database, according to various embodiments.

A capsule database (e.g., the capsule DB 1230) of the intelligence server (e.g., the intelligence server 1200) may store a capsule in the form of a CAN. The capsule DB may store an action for processing a task corresponding to a user's voice input and a parameter necessary for the action, in the CAN form.

The capsule DB may store a plurality capsules (a capsule A 201 and a capsule B 204) respectively corresponding to a plurality of domains (e.g., applications). According to an embodiment, a single capsule (e.g., the capsule A 201) may correspond to a single domain (e.g., a location (geo) or an application). Furthermore, at least one service provider (e.g., CP 1 202 or CP 2 203) for performing a function for a domain associated with the capsule may correspond to one capsule. According to an embodiment, the single capsule may include at least one or more actions 210 and at least one or more concepts 220 for performing a specified function.

The natural language platform (not illustrated) (e.g., the natural language platform 1220 of FIG. 1) may generate a plan for performing a task corresponding to the received voice input, using the capsule stored in the capsule DB. For example, a planner module (not illustrated) (e.g., the planner module 1225 of FIG. 1) of the natural language platform may generate a plan, using the capsule stored in the capsule DB. For example, a plan 207 may be generated using actions 2011 and 2013 and concepts 2012 and 2014 of the capsule A 201 and an action 2041 and a concept 2042 of the capsule B 204.

Figure 3:
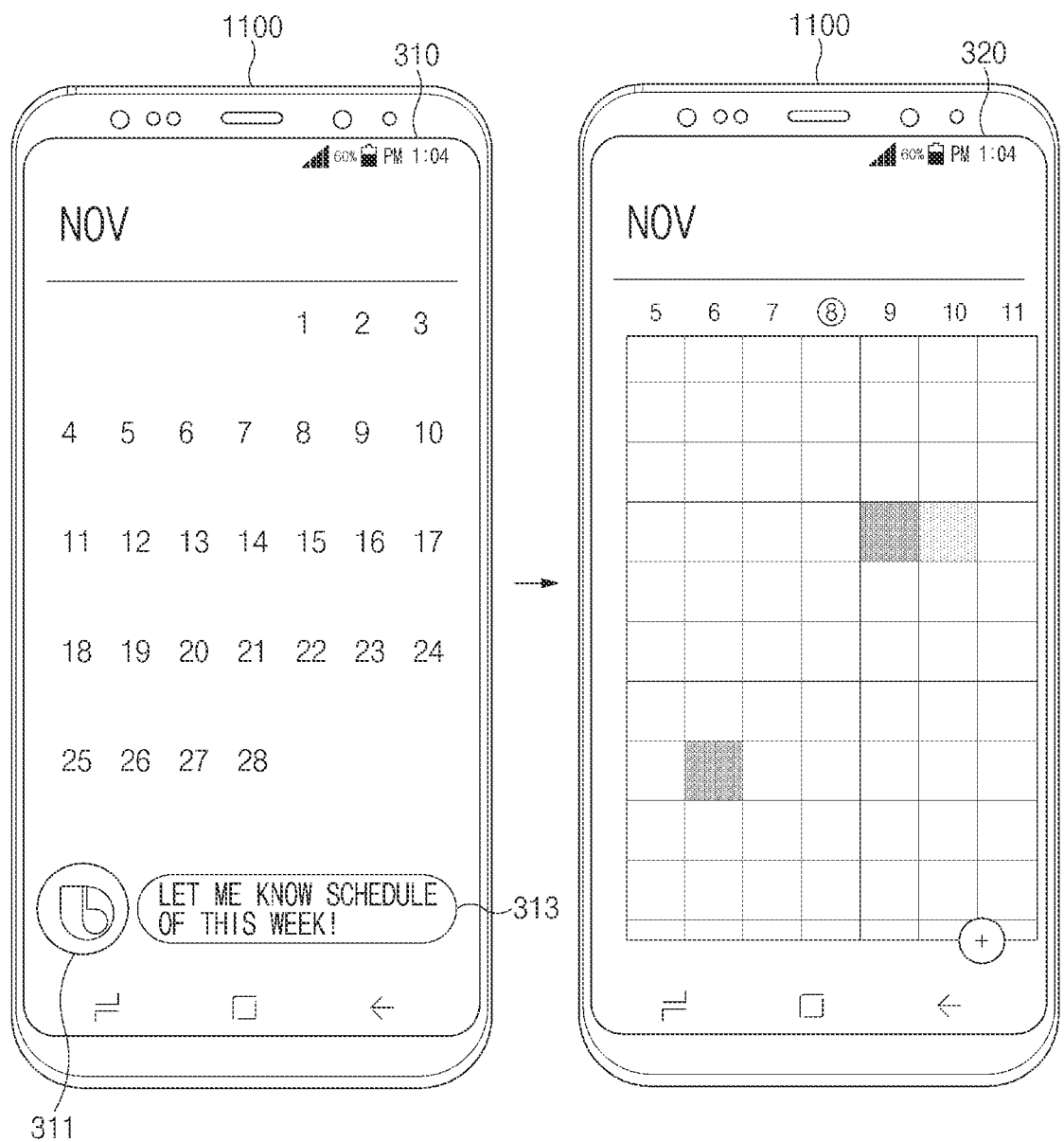
FIG. 3 is a diagram illustrating an example screen in which a user terminal processes a voice input received through an intelligence app, according to various embodiments.

FIG. 3 is a diagram illustrating an example screen in which a user terminal processes a voice input received through an intelligence app, according to various embodiments.

A user terminal 300 (e.g., the user terminal 1100 of FIG. 1) may launch an intelligence app to process a user input through an intelligence server (not shown) (e.g., the intelligence server 1200 of FIG. 1).

According to an embodiment, on screen 310, when recognizing a specified voice input (e.g., wake up!) or receiving an input via a hardware key (e.g., a dedicated hardware key), the user terminal 300 may launch an intelligence app for processing a voice input. For example, the user terminal 300 may launch the intelligence app in a state where a schedule app is executed. According to an embodiment, the user terminal 300 may display an object (e.g., an icon) 311 corresponding to the intelligence app, on the display. According to an embodiment, the user terminal 300 may receive a voice input by a user utterance. For example, the user terminal 300 may receive a voice input saying that "Let me know the schedule of this week!". According to an embodiment, the user terminal 300 may display a user interface (UI) 313 (e.g., an input window) of the intelligence app, in which text data of the received voice input is displayed, on a display.

According to an embodiment, on screen 320, the user terminal 300 may display a result corresponding to the received voice input, on the display. For example, the user terminal 300 may receive the plan corresponding to the received user input and may display 'the schedule of this week' on the display depending on the plan.

Figure 4:
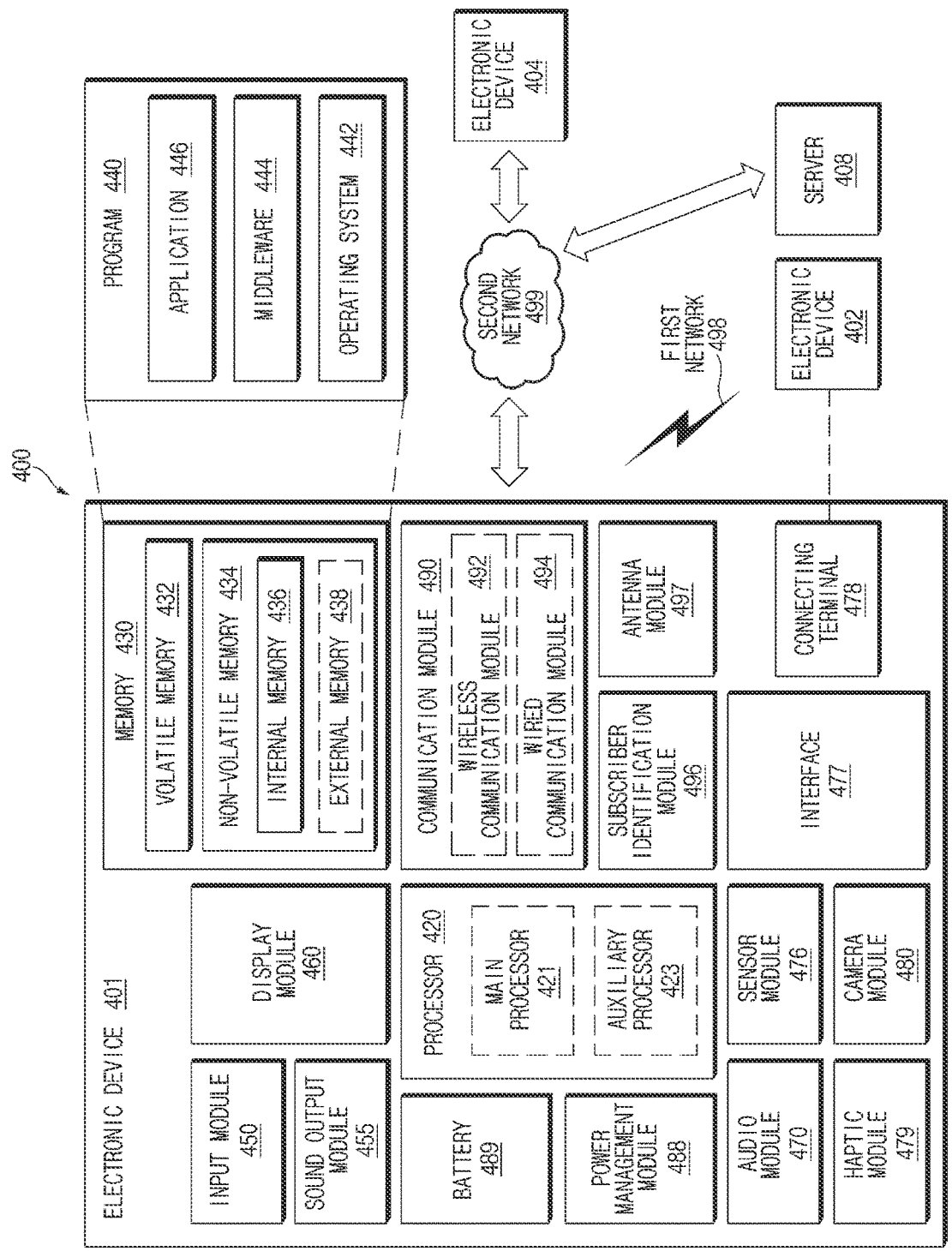
FIG. 4 is a block diagram illustrating an example electronic device in a network environment, according to various embodiments.

FIG. 4 is a block diagram illustrating an example electronic device 401 in a network environment 400 according to various embodiments.

Referring to FIG. 4, the electronic device 401 in the network environment 400 may communicate with an electronic device 402 via a first network 498 (e.g., a short-range wireless communication network), or an electronic device 404 or a server 408 via a second network 499 (e.g., a long-range wireless communication network). According to an embodiment, the electronic device 401 may communicate with the electronic device 404 via the server 408. According to an embodiment, the electronic device 401 may include a processor 420, a memory 430, an input module 450, a sound output module 455, a display module 460, an audio module 470, a sensor module 476, an interface 477, a connecting terminal 478, a haptic module 479, a camera module 480, a power management module 488, a battery 489, a communication module 490, a subscriber identification module (SIM) 496, or an antenna module 497. In some embodiments, at least one (e.g., the connecting terminal 478) of the components may be omitted from the electronic device 401, or one or more other components may be added in the electronic device 401. In an embodiment, some (e.g., the sensor module 476, the camera module 480, or the antenna module 497) of the components may be implemented as single component (e.g., the display module 460).

The processor 420 may execute, for example, software (e.g., a program 440) to control at least one other component (e.g., a hardware or software component) of the electronic device 401 coupled with the processor 420, and may perform various data processing or computation. According to an embodiment, as at least part of the data processing or computation, the processor 420 may store a command or data received from another component (e.g., the sensor module 476 or the communication module 490) in a volatile memory 432, process the command or the data stored in the volatile memory 432, and store resulting data in a non-volatile memory 434. According to an embodiment, the processor 420 may include a main processor 421 (e.g., a central processing unit (CPU) or an application processor (AP)), and an auxiliary processor 423 (e.g., a graphics processing unit (GPU), a neural processing unit (NPU), an image signal processor (ISP), a sensor hub processor, or a communication processor (CP)) that is operable independently from, or in conjunction with, the main processor 421. For example, when the electronic device 401 includes the main processor 421 and the auxiliary processor 423, the auxiliary processor 423 may be adapted to consume less power than the main processor 421, or to be specific to a specified function. The auxiliary processor 423 may be implemented as separate from, or as part of the main processor 421.

The auxiliary processor 423 may control at least some of functions or states related to at least one component (e.g., the display module 460, the sensor module 476, or the communication module 490) among the components of the electronic device 401, instead of the main processor 421 while the main processor 421 is in an inactive (e.g., sleep) state, or together with the main processor 421 while the main processor 421 is in an active state (e.g., executing an application). According to an embodiment, the auxiliary processor 423 (e.g., an image signal processor or a communication processor) may be implemented as part of another component (e.g., the camera module 480 or the communication module 490) functionally related to the auxiliary processor 423. According to an embodiment, the auxiliary processor 423 (e.g., a neural network processing unit) may include a hardware structure specialized to process an artificial intelligence model. The artificial intelligence model may be generated through machine learning. For example, the learning may be performed in the electronic device 401, in which an artificial intelligence program is performed, or may be performed through a separate server (e.g., server 408). For example, the learning algorithm may include supervised learning, unsupervised learning, semi-supervised learning, or reinforcement learning, but may not be limited to the above example. The artificial intelligence model may include a plurality of artificial neural network layers. The artificial neural network may be one of a deep neural network (DNN), a convolutional neural network (CNN), a recurrent neural network (RNN), a restricted Boltzmann machine (RBM), a deep belief network (DBN), a bidirectional recurrent deep neural network (BRDNN), a deep Q-network, or a combination of two or more of the above-described networks, but may not be limited to the above-described example. In addition to a hardware structure, additionally or alternatively, the artificial intelligence model may include a software structure.

The memory 430 may store various data used by at least one component (e.g., the processor 420 or the sensor module 476) of the electronic device 401. The various data may include, for example, software (e.g., the program 440) and input data or output data for a command related thereto. The memory 430 may include the volatile memory 432 or the non-volatile memory 434.

The program 440 may be stored in the memory 430 as software, and may include, for example, an operating system (OS) 442, middleware 444, or an application 446.

The input module 450 may receive a command or data to be used by other component (e.g., the processor 420) of the electronic device 401, from the outside (e.g., a user) of the electronic device 401. The input module 450 may include, for example, a microphone, a mouse, a keyboard, a key (e.g., a button), or a digital pen (e.g., a stylus pen).

The sound output module 455 may output sound signals to the outside of the electronic device 401. The sound output module 455 may include, for example, a speaker or a receiver. The speaker may be used for general purposes, such as playing multimedia or playing record. The receiver may be used for an incoming call. According to an embodiment, the receiver may be implemented as separate from, or as part of the speaker.

The display module 460 may visually provide information to the outside (e.g., a user) of the electronic device 401. The display module 460 may include, for example, a display, a hologram device, or a projector and control circuitry to control a corresponding one of the display, hologram device, and projector. According to an embodiment, the display module 460 may include a touch sensor adapted to detect a touch, or a sensor (e.g., a pressure sensor) adapted to measure the intensity of force incurred by the touch.

The audio module 470 may convert a sound into an electrical signal and vice versa. According to an embodiment, the audio module 470 may obtain the sound via the input module 450, or output the sound via the sound output module 455 or an external electronic device (e.g., the electronic device 402) (e.g., speaker of headphone) directly (e.g., wiredly) or wirelessly coupled with the electronic device 401.

The sensor module 476 may detect an operational state (e.g., power or temperature) of the electronic device 401 or an environmental state (e.g., a state of a user) external to the electronic device 401, and then generate an electrical signal or data value corresponding to the detected state. According to an embodiment, the sensor module 476 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 477 may support one or more specified protocols to be used for the electronic device 401 to be coupled with the external electronic device (e.g., the electronic device 402) directly (e.g., wiredly) or wirelessly.

According to an embodiment, the interface 477 may include, for example, a high definition multimedia interface (HDMI), a universal serial bus (USB) interface, a secure digital (SD) card interface, or an audio interface.

The connecting terminal 478 may include a connector via which the electronic device 401 may be physically connected with the external electronic device (e.g., the electronic device 402). According to an embodiment, the connecting terminal 478 may include, for example, a HDMI connector, a USB connector, an SD card connector, or an audio connector (e.g., a headphone connector).

The haptic module 479 may convert an electrical signal into a mechanical stimulus (e.g., a vibration or a movement) or electrical stimulus which may be recognized by a user via his tactile sensation or kinesthetic sensation. According to an embodiment, the haptic module 479 may include, for example, a motor, a piezoelectric element, or an electric stimulator.

The camera module 480 may capture a still image or moving images. According to an embodiment, the camera module 480 may include one or more lenses, image sensors, image signal processors, or flashes.

The power management module 488 may manage power supplied to the electronic device 401. According to an embodiment, the power management module 488 may be implemented as at least part of, for example, a power management integrated circuit (PMIC).

The battery 489 may supply power to at least one component of the electronic device 401. According to an embodiment, the battery 489 may include, for example, a primary cell which is not rechargeable, a secondary cell which is rechargeable, or a fuel cell.

The communication module 490 may support establishing a direct (e.g., wired) communication channel or a wireless communication channel between the electronic device 401 and the external electronic device (e.g., the electronic device 402, the electronic device 404, or the server 408) and performing communication via the established communication channel. The communication module 490 may include one or more communication processors that are operable independently from the processor 420 (e.g., the application processor (AP)) and supports a direct (e.g., wired) communication or a wireless communication. According to an embodiment, the communication module 490 may include a wireless communication module 492 (e.g., a cellular communication module, a short-range wireless communication module, or a global navigation satellite system (GNSS) communication module) or a wired communication module 494 (e.g., a local area network (LAN) communication module or a power line communication (PLC) module). A corresponding one of these communication modules may communicate with the external electronic device 404 via the first network 498 (e.g., a short-range communication network, such as Bluetooth™, wireless-fidelity (Wi-Fi) direct, or infrared data association (IrDA)) or the second network 499 (e.g., a long-range communication network, such as a legacy cellular network, a 5G network, a next generation communication network, the Internet, or a computer network (e.g., LAN or wide area network (WAN))). These various types of communication modules may be implemented as a single component (e.g., a single chip), or may be implemented as multi components (e.g., multi chips) separate from each other. The wireless communication module 492 may identify or authenticate the electronic device 401 in a communication network, such as the first network 498 or the second network 499, using subscriber information (e.g., international mobile subscriber identity (IMSI)) stored in the subscriber identification module 496.

The wireless communication module 492 may support a 5G network and a next-generation communication technology after a 4G network, for example, a new radio (NR) access technology. The NR access technology may support high-speed transmission of high-capacity data (enhanced mobile broadband (eMBB)), terminal power minimization and connection of multiple terminals (massive machine type communications (mMTC)), or ultra-reliable and low-latency communications (URLLC). For example, the wireless communication module 492 may support a high frequency band (e.g., mmWave band) to achieve a high data transfer rate. The wireless communication module 492 may support various technologies for securing performance in a high frequency band, for example, technologies such as beamforming, massive multiple-input and multiple-output (massive MIMO), full dimensional MIMO (FD-MIMO), an array antenna, analog beam-forming, and a large scale antenna. The wireless communication module 492 may support various requirements regulated in the electronic device 401, an external electronic device (e.g., the electronic device 404) or a network system (e.g., the second network 499). According to an embodiment, the wireless communication module 492 may support peak data rate (e.g., 20 Gbps or more) for eMBB implementation, loss coverage (e.g., 164 dB or less) for mMTC implementation, or U-plane latency (e.g., downlink (DL) of 0.5 ms or less and uplink (UL) of 0.5 ms or less, or round trip of 1 ms or less) for URLLC implementation.

The antenna module 497 may transmit or receive a signal or power to or from the outside (e.g., the external electronic device) of the electronic device 401. According to an embodiment, the antenna module 497 may include an antenna including a radiating element including a conductive material or a conductive pattern formed in or on a substrate (e.g., PCB). According to an embodiment, the antenna module 497 may include a plurality of antennas (e.g., an antenna array). In such a case, at least one antenna appropriate for a communication scheme used in the communication network, such as the first network 498 or the second network 499, may be selected, for example, by the communication module 490 from the plurality of antennas. The signal or the power may then be transmitted or received between the communication module 490 and the external electronic device via the selected at least one antenna. According to an embodiment, another component (e.g., a radio frequency integrated circuit (RFIC)) other than the radiating element may be additionally formed as part of the antenna module 497.

According to various embodiments, the antenna module 497 may form an mmWave antenna module. According to an embodiment, the mmWave antenna module may include a printed circuit board (PCB), a radio frequency integrated circuit (RFIC), and a plurality of antennas (e.g., an array antenna). The RFIC may be disposed on or adjacent to a first surface (e.g., a bottom surface) of the PCB and may support a specified high frequency band (e.g., mmWave band). The plurality of antennas may be disposed on or adjacent to a second surface (e.g., a top surface or a side surface) of the PCB and may transmit or receive a signal in the specified high frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 401 and the external electronic device 404 via the server 408 coupled with the second network 499. Each of the external electronic devices 402 and 404 may be a device of a same type as, or a different type, from the electronic device 401. According to an embodiment, all or some of operations to be executed at the electronic device 401 may be executed at one or more of the external electronic devices 402, 404, or 408. For example, when the electronic device 401 should perform a function or a service automatically, or in response to a request from a user or another device, the electronic device 401, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 401. The electronic device 401 may provide the outcome, with or without further processing of the outcome, as at least part of a reply to the request. To that end, a cloud computing, distributed computing, mobile edge computing (MEC), or client-server computing technology may be used, for example. For example, the electronic device 401 may provide an ultra-low latency service using distributed computing or mobile edge computing. In an embodiment, the external electronic device 404 may include an Internet of Things (IoT) device. The server 408 may be an intelligence server using machine learning and/or a neural network. According to an embodiment, the external electronic device 404 or the server 408 may be included in the second network 499. The electronic device 401 may be applied to an intelligence service (e.g., a smart home, a smart city, a smart car, or a healthcare) based on 5G communication technology and IoT-related technology.

According to an embodiment, the electronic device 401 may be the same or substantially the same component as the user terminal 1100 or the user terminal 300 described with reference to FIG. 1 or 3. For example, the electronic device 401, the user terminal 1110, or the user terminal 300 may include a component, which is in common with at least part of the above-described components, or may perform an operation that is in common with at least part of the above-described operations.

Figure 5:
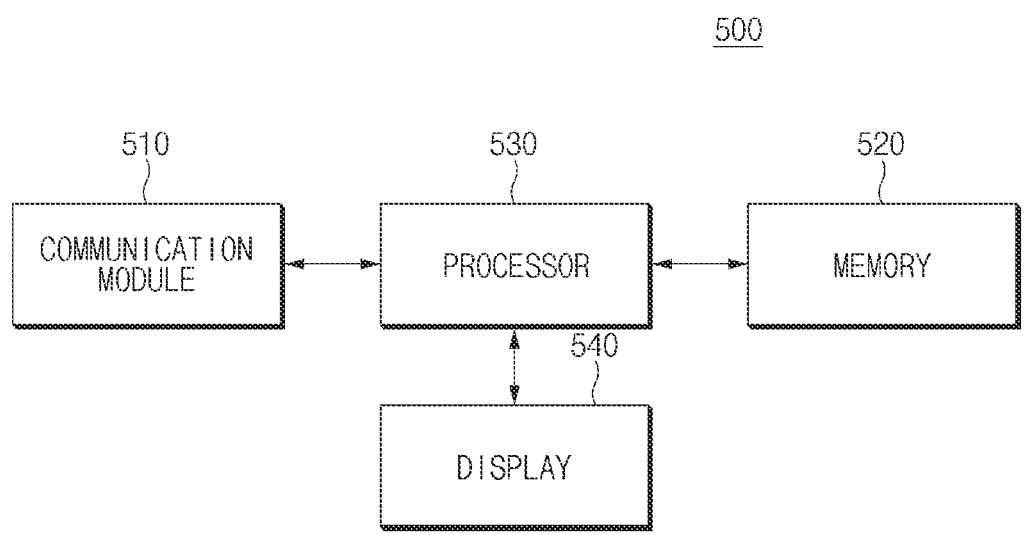
FIG. 5 is a block diagram illustrating an example configuration of an electronic device according to various embodiments.

FIG. 5 is a block diagram illustrating an example configuration of an electronic device according to various embodiments.

According to an embodiment, an electronic device 500 (e.g., the user terminal 1100 of FIG. 1, the user terminal 300 of FIG. 3, or the electronic device 401 of FIG. 4) may include a communication module (e.g., including communication circuitry) 510 (e.g., the communication interface 1110 of FIG. 1 or the communication module 490 of FIG. 4), a memory 520 (e.g., the memory 1150 of FIG. 1 or the memory 430 of FIG. 4), a processor (e.g., including processing circuitry) 530 (e.g., the processor 1160 of FIG. 1 or the processor 420 of FIG. 4), and a display 540 (e.g., the display 1140 of FIG. 1 or the display module 460 of FIG. 4).

According to an embodiment, the communication module 510 may include various communication circuitry and make a call (or communication) to an external electronic device (not shown) by wire and/or wirelessly. For example, the communication module 510 may be implemented using a physical hardware module, logic, a logic block, or an electric and/or electronic circuit for making a call (or communication) to the external electronic device (not shown). For example, the call may include a voice call using sound. When the electronic device 500 makes a voice call, the display 540 may display a predetermined image. For example, the call may include a video call using an image or video. For example, when the electronic device 500 makes a video call, the display 540 may display an image or video obtained through a camera (e.g., the camera module 480 of FIG. 4), may display an image or video received from the external electronic device through the communication module 510, or may display a predetermined image.

According to an embodiment, the communication module 510 may provide data to an external server (not shown) and may receive data from the external server. According to an embodiment, the electronic device 500 may exchange information with the external server (not shown) through the communication module 510.

The electronic device 500 according to an embodiment may include a plurality of communication modules. The electronic device 500 according to an embodiment may make a call to the external electronic device (not shown) through different communication modules and may exchange information with the external server (not shown). According to various embodiments, the electronic device 500 may make a call to the external electronic device (not shown) through one communication module and may exchange information with the external server (not shown).

According to an embodiment, the memory 520 may store at least one program, at least one application, data, and/or instructions to be executed by the processor 530. According to an embodiment, the memory 520 may include at least part of the memory 1150 shown in FIG. 1 or at least part of the memory 430 shown in FIG. 4.

According to an embodiment, the processor 530 may include various processing circuitry and identify (or authenticate) whether a user (e.g., a call receiver) of the external electronic device is authentic, using data obtained while the electronic device 500 makes a call to the external electronic device.

For example, assuming that the electronic device 500 makes either a voice call or a video call to the external electronic device, the processor 530 may obtain unique information (or identification information) (e.g., a phone number) of the external electronic device and information associated with the user of the external electronic device. The information associated with the user of the external electronic device may include one of voice information, image information, or video information of a call receiver obtained while a call is connected. For example, the voice information may include an utterance of the call receiver. For example, the image information or the video information may include an image or video (e.g., in the case of making a video call, video information of the call receiver) of the call receiver.

According to an embodiment, the processor 530 may compare information included in a contact application with the obtained unique information of the external electronic device and may obtain information about a call receiver candidate corresponding to at least part of information obtained by comparing the information included in the contact application with the obtained unique information of the external electronic device. According to an embodiment, the processor 530 may generate a candidate group including at least one candidate estimated as the user of the external electronic device. The processor 530 may provide the external server with information associated with the candidate group and then may receive a reliability value of at least one candidate from the external server. For example, the information associated with the candidate group may include at least one of unique information corresponding to each candidate or a name corresponding to each candidate.

According to an embodiment, when the contact application includes information matched with the unique information of the external electronic device, the processor 530 may provide an external server with a public certificate included in the contact application, the obtained information associated with the user of the external electronic device, and information associated with the candidate group. For example, when the electronic device 500 connects a call to an external electronic device corresponding to the unique information corresponding, for example, to 'dad' in the contact application of the electronic device 500, the processor 530 may identify the matched unique information and may generate a candidate group including 'dad'. According to an embodiment, the processor 530 may determine a candidate estimated as the call receiver by analyzing the information associated with the user of the external electronic device, and then may further include the estimated candidate in the candidate group. For example, when the information associated with the user of the external electronic device includes voice information (e.g., an utterance of the user of the external electronic device), the processor 530 may extract a context included in the voice information, may determine a candidate corresponding to the extracted context, and may further include the determined candidate in the candidate group. For example, when the user of the external electronic device provides an utterance of "I am mom.", the processor 530 may extract 'mom' from the content of the provided utterance, and may generate the candidate group including 'dad' corresponding to unique information of the external electronic device and 'mom' extracted from information associated with the user of the external electronic device. According to an embodiment, the processor 530 may provide the external server with information associated with the candidate group. For example, the processor 530 may obtain information associated with the candidate group stored in the contact application, and then may provide the external server with information associated with the candidate group, a public certificate included in the contact application, and the obtained information (e.g., voice information, image information, or video information) associated with the user of the external electronic device. The information associated with the candidate group may include unique information (e.g., a phone number) or a name that corresponds to each candidate. According to the above example, the information associated with the candidate group may include unique information or a name that corresponds to 'mom' and 'dad'.

According to an embodiment, when there is no matching information in the contact application, the processor 530 may generate the candidate group estimated as a call receiver by analyzing the obtained information associated with the user of the external electronic device. According to an embodiment, when the information associated with the user of the external electronic device includes voice information, the processor 530 may extract a context included in the voice information and then may generate a candidate group corresponding to the extracted context. For example, when a call is connected to an external electronic device having unique information not stored in the contact application and the user of the external electronic device utters "I am mom. I'm on my way to see dad", the processor 530 may extract 'mom' and 'dad' from the entered utterance content. The processor 530 may determine whether the extracted context (e.g., mom or dad) at least partially matches information included in the contact application. When the extracted context at least partially matches the information, the processor 530 may generate a candidate group including a target corresponding to the extracted context. According to an embodiment, the processor 530 may provide the external server with information associated with the candidate group. For example, the processor 530 may obtain information associated with the candidate group stored in the contact application, and then may provide the external server with information associated with the candidate group, a public certificate included in the contact application, and the obtained information (e.g., voice information, image information, or video information) associated with the user of the external electronic device. The information associated with the candidate group may include unique information (e.g., a phone number) or a name that corresponds to each candidate. According to the above example, the information associated with the candidate group may include unique information or a name that corresponds to 'mom' and 'dad'.

According to an embodiment, the processor 530 may provide information associated with a candidate group, a public certificate included in a contact application, and the obtained information associated with the user of the external electronic device to the external server through the communication module 510. For example, the obtained information associated with the user of the external electronic device may include at least part of an utterance provided by the user of the external electronic device. The processor 530 may receive, from the external server through the communication module 510, a reliability value indicating reliability of information associated with the user of the external electronic device. For example, the reliability value received by the processor 530 may include a value inferred based on an AI model included in an AI system operated by the external server.

According to an embodiment, the external server may authenticate voice information, image information, or video information of a user of the electronic device 500 using the received public certificate. When the user of the electronic device 500 is successfully authenticated, the external server may compute (or calculate) the reliability of information associated with the user of the external electronic device, which may, for example, be obtained using the AI model corresponding to the information associated with the candidate group. For example, the external server may operate the AI system. For example, the external server may include at least one AI model, and each AI model may include a result trained using personal information corresponding to each user. For example, a user model may include an AI model associated with each user. According to an embodiment, the external server may generate a reliability value using an AI model, which corresponds to a user included in the information associated with the candidate group, from among at least one AI model.

For example, the external server may receive, through the communication module 510 of the electronic device 500, the information associated with the candidate group including information corresponding to 'mom' and 'dad' and voice information including "I'm mom". The external server may also receive voice information including "I'm mom. I'm on my way to see dad". The voice information received by the external server may be information associated with the user of the external electronic device obtained while the electronic device 500 connects a voice call to the external electronic device. According to an embodiment, the external server may generate the reliability value by computing (or calculating) how much voice information including "I'm mom." or "I'm mom. I'm on my way to see dad." matches the user corresponding to "mom" or "dad", using AI models, which respectively correspond to 'mom' and 'dad', from among at least one AI model. For example, the reliability value may be a value inferred based on an AI model corresponding to 'mom' or 'dad', and may indicate an extent to which voice information is matched or similar to the AI model corresponding to 'mom' or 'dad'.

According to an embodiment, the external server may further receive at least one of image information or video information through the communication module 510 of the electronic device 500. The image information or video information received by the external server may be information, which is associated with the user of the external electronic device and which is obtained while the electronic device 500 connects a video call to the external electronic device. According to an embodiment, the external server may generate the reliability value by computing (or calculating) how much the received image information or video information matches a user corresponding to "mom" or "dad", using an AI model, which corresponds to 'mom' or 'dad', from among at least one AI model. For example, the external server may infer an extent to which the image information or video information is reliable, based on the AI model corresponding to the 'mom' or 'dad' and then may generate a reliability value corresponding to the inferred result.

According to an embodiment, the external server may provide the generated reliability value to the electronic device 500 using the communication module 510.

According to an embodiment, the processor 530 may receive the reliability value from the external server and may determine a user interface (UI) to be displayed on the display 540 based on the received reliability value. For example, when the reliability value is less than a predetermined threshold value, the processor 530 may allow the display 540 to display a first UI indicating that a call receiver is an unauthentic user. For example, when the reliability value is not less than the predetermined threshold value, the processor 530 may allow the display 540 to display a second UI indicating that the call receiver is an authentic user. The reliability value may indicate how reliable information associated with the electronic device 500 and the user of the external electronic device is.

According to an embodiment, the electronic device 500 may display a UI indicating whether the user of the external electronic device that is during a call is authentic, on the display 540, thereby protecting a user of the electronic device 500 from attacks using various electronic technologies.

According to an embodiment, the authentic user may include a user corresponding to unique information of the external electronic device that is during a call. For example, when a call receiver making a call through an electronic device (e.g., an external electronic device) of 'dad' is "dad", the call receiver may be an authentic user. According to an embodiment, the authentic user may include a user corresponding to a reliability value, which is not less than the predetermined threshold value, depending on the result of training information associated with a call receiver using an AI model corresponding to at least one candidate included in the candidate group. For example, when a call receiver making a call through an electronic device of 'dad' is 'mom', and the call receiver provides an utterance of 'I'm mom', the call receiver may be an authentic user. In this case, the electronic device 500 may display a UI indicating that the call receiver is an authentic user. For example, the electronic device 500 may display, on the display 540, at least one of a (3-1)-th UI 7d or a (3-2)-th UI 7g to be described in greater detail below with reference to FIGS. 7C and 7F.

According to an embodiment, a user who is not genuine may include a user who pretends to be anyone. For example, the user who is not genuine may include a user or object that pretends to be anyone, using voice information, image information, or video information generated using various electronic technologies (e.g., AI technology). For example, the electronic device 500 may obtain an utterance of "I'm mom" generated through a third party or artificial voice. The electronic device 500 according to an embodiment may receive, from the external server, a reliability value generated depending on a result of training an obtained utterance using an AI model associated with 'mom'. The received reliability value may have a value less than the predetermined threshold value indicating that a feature of the obtained utterance does not correspond to 'mom'. In this case, the electronic device 500 may display, on the display 540, a UI indicating that the call receiver is an unauthentic user. For example, the electronic device 500 may display, on the display 540, at least one of a (2-1)-th UI 7b or a (2-2)-th UI 7f to be described in greater detail below with reference to FIGS. 7B and 7E.

According to an embodiment, the electronic device 500 may generate information associated with a candidate group, in which a candidate is estimated as a user of the external electronic device among a lot of users, and the external server may compute (or calculate) a reliability value using the AI model corresponding to the information associated with the candidate group. Accordingly, the electronic device 500 may receive (or obtain) a reliability value indicating whether the user of the external electronic device is an authentic user, from the external server at an improved speed, and may quickly display a UI corresponding to the reliability value on the display 540.

Figure 6:
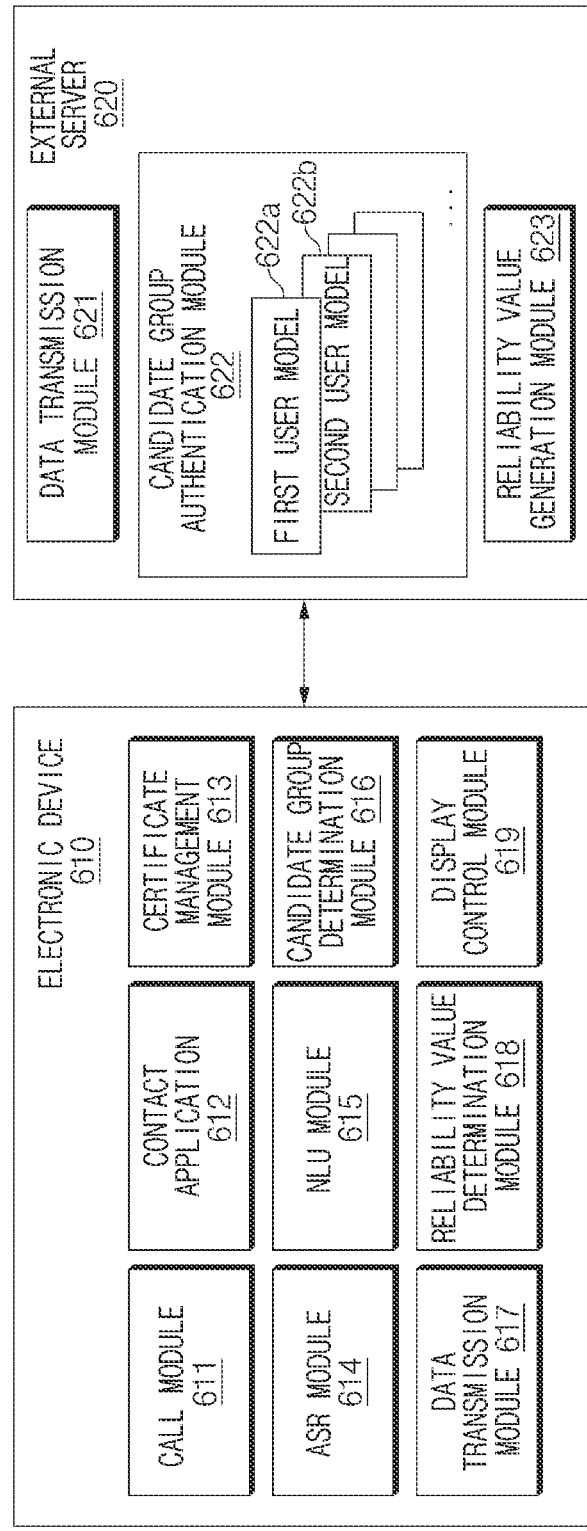
FIG. 6 is a block diagram illustrating an example configuration of an electronic device and an external server according to various embodiments.

FIG. 6 is a block diagram illustrating an example configuration of an electronic device and an external server according to various embodiments.

Referring to FIG. 6, an electronic device 610 (e.g., the user terminal 1100 of FIG. 1, the user terminal 300 of FIG. 3, the electronic device 401 of FIG. 4, or the electronic device 500 of FIG. 5) may include at least one of a call module 611, a contact application 612, a certificate management module 613, an automatic speech recognition (ASR) module 614 (hereinafter, referred to as an "ASR module"), a natural language understanding (NLU) module 615 (hereinafter, referred to as an "NLU module"), a candidate group determination module 616, a data transmission module 617, a reliability value determination module 618, and/or a display control module 619. For example, configurations of the various modules of the electronic device 610 illustrated in FIG. 6 may include software modules including one or more instructions stored in a memory (e.g., the memory 1150 of FIG. 1, the memory 430 of FIG. 4, or the memory 520 of FIG. 5) of the electronic device 610. For example, the software modules may be executed by various circuitry, including, for example, a processor (e.g., the processor 1160 of FIG. 1, the processor 420 of FIG. 4, or the processor 530 of FIG. 5). According to an example embodiment, one or more of the configurations may be implemented using a physical hardware module, logic, a logic block, or a circuit; and, the processor may include at least one of the configurations (e.g., the processor 1160 of FIG. 1, the processor 420 of FIG. 4, or the processor 530 of FIG. 5).

According to an embodiment, the call module 611 may connect a call to an external electronic device (not shown) instead of an external server 620. For example, the call module 611 may receive a call from the external electronic device (not shown) instead of the external server 620. For example, the electronic device 610 may accept the received call request and may communicate with the external electronic device wired and/or wirelessly using a communication module (e.g., the communication interface 1110 of FIG. 1, the communication module 490 of FIG. 4, or the communication module 510 of FIG. 5).

According to an embodiment, the contact application 612 may include contact information about a plurality of people. For example, the contact information may include information associated with the plurality of people. For example, the information associated with the plurality of people may include information (e.g., a name) for identifying each of the plurality of people and unique information (e.g., a phone number) corresponding to each of the plurality of people. According to an embodiment, the contact application may include a public certificate associated with a user of the electronic device 610 generated from the certificate management module 613.

According to an embodiment, the certificate management module 613 may receive, from the user of the electronic device 610, the user's consent for storing the user's personalization information in a database, and may generate a private key based on the user's consent. According to an embodiment, the certificate management module 613 may store the private key in a memory of the electronic device 610. The certificate management module 613 may provide personal information of the user of the electronic device 610, which is encrypted using the private key, to the external server 620 through the data transmission module 617. The user's personal information may include one of voice information generated by the user's utterance, the user's image information, or the user's video information.

According to an embodiment, the certificate management module 613 may generate a public key paired with the private key. According to an embodiment, the certificate management module 613 may generate a public certificate to be used to authenticate the user's personalization information using the public key. According to an embodiment, the certificate management module 613 may include the generated public certificate in the contact application 612.

According to an embodiment, the ASR module 614 may convert the user's voice information (e.g., an utterance), which is entered into the electronic device 610, to text information. For example, the ASR module 614 may convert voice information, which is entered from a user of the electronic device 610 or a user (e.g., a call receiver) of an external electronic device, to text information.

According to an embodiment, the NLU module 615 may obtain the meaning of a word extracted from the voice information using linguistic features (e.g., syntactic elements) of morphemes or phrases. For example, the NLU module 615 may obtain the meaning of a word by performing syntactic analysis or semantic analysis.

For example, when the user of the external electronic device provides an utterance including "I'm mom", the ASR module 614 or the NLU module 615 may extract a context included in the utterance. For example, the ASR module 614 or the NLU module 615 may extract 'mom'.

For example, when the user of the external electronic device provides an utterance including "I'm mom. I'm on my way to see dad", the ASR module 614 or the NLU module 615 may extract 'mom' and 'dad'.

According to an embodiment, the candidate group determination module 616 may determine a user candidate, which matches at least part of data included in the contact application 612, using the unique information (e.g., a phone number) of the external electronic device, which is during a call, and a context extracted through the ASR module 614 and/or the NLU module 615.

According to an embodiment, when the unique information of the external electronic device is included in the contact application 612, the candidate group determination module 616 may generate a candidate group including a person corresponding to the corresponding unique information. For example, when a call is connected to an external electronic device having unique information stored as 'dad' in the contact application 612, the candidate group determination module 616 may generate a candidate group including a user corresponding to 'dad'. According to an embodiment, the candidate group determination module 616 may generate a candidate group including a candidate corresponding to the extracted context. For example, when the context extracted through the ASR module 614 and/or the NLU module 615 includes 'mom' and 'dad', the candidate group determination module 616 may generate a candidate group including users corresponding to 'mom' and 'dad'.

According to an embodiment, the data transmission module 617 may provide the external server 620 with information associated with the candidate group generated by the candidate group determination module 616, a public certificate included in the contact application 612, and the obtained information associated with the user of the external electronic device.

According to an embodiment, the reliability value determination module 618 may determine whether a reliability value received from the external server 620 is not less than a predetermined threshold value. For example, when the reliability value is less than the predetermined threshold value, the display control module 619 may allow the display of the electronic device 610 to display a first UI. For example, when the reliability value is not less than the predetermined threshold value, the display control module 619 may allow the display of the electronic device 610 to display a second UI different from the first UI.

According to an embodiment, the display control module 619 may display different UIs from one another based on the result determined by the reliability value determination module 618.

Referring to FIG. 6, the external server 620 may include at least one of a data transmission module 621, a candidate group authentication module 622 or a reliability value generation module 623. For example, configurations of the external server 620 illustrated in FIG. 6 may be the same as or similar to at least part of the configurations of the intelligence server 1200 or the service server 1300 illustrated in FIG. 1. Additionally, configurations of the various modules of the external server 620 illustrated in FIG. 6 may include software modules including one or more instructions stored in a memory. For example, the software modules may be executed by various circuitry, including, for example, a processor. According to an example embodiment, one or more of the configurations may be implemented using a physical hardware module, logic, a logic block, or a circuit; and, the processor may include at least one of the configurations.

According to an embodiment, the data transmission module 621 may transmit data to the electronic device 610. For example, the data transmission module 621 may provide the electronic device 610 with a reliability value generated by the reliability value generation module 623.

According to an embodiment, the candidate group authentication module 622 may receive a public certificate from the electronic device 610, and may authenticate a user of the electronic device 610 using a public key. According to an embodiment, the candidate group authentication module 622 may include a plurality of AI models. The plurality of AI models may have configurations the same as or corresponding to one or more user models (622a, 622b . . . ) shown in FIG. 6. For example, the one or more user models (622a, 622b . . . ) may be AI models trained using personalization information about each user. The one or more user models (622a, 622b . . . ) may be AI models, which are distinguished from one another and which are trained using pieces of personalization information associated with different users, respectively. According to an embodiment, when the user of the electronic device 610 is successfully authenticated, the candidate group authentication module 622 may compute (or calculate) a similarity through the one or more user models (622a, 622b . . . ).

According to an embodiment, the candidate group authentication module 622 may include the one or more user models (622a, 622b . . . ) including a result trained using personalization information corresponding to each user. The candidate group authentication module 622 may compute (or calculate) a similarity by entering information associated with a candidate group received from the electronic device 610 into the one or more user models (622a, 622b . . . ). According to an embodiment, the external server 620 may train the one or more user models (622a, 622b . . . ) using personal information of a user that is encrypted using a private key. For example, the external server 620 may train the one or more user models (622a, 622b . . . ) in a scheme of federated learning.

For example, the candidate group authentication module 622 may include a first user model 622a and a second user model 622b. The first user model 622a is a result trained as personalization information corresponding to a first user. The second user model 622b is a result trained as personalization information corresponding to a second user. According to an embodiment, when the entered information strongly matches the model, the candidate group authentication module 622 may determine that the similarity is high. On the other hand, when the entered information weakly matches the model, the candidate group authentication module 622 may determine that the similarity is low. For example, when information (voice information, image information, or video information) associated with the first user is entered into the first user model 622a, the candidate group authentication module 622 may determine that the similarity is relatively high. When information associated with the first user is entered into the second user model 622b, the candidate group authentication module 622 may determine that the similarity is relatively low.

According to an embodiment, the candidate group authentication module 622 may determine (or select) a user model, which is used to input information associated with a candidate group, from among the one or more user models (622a, 622b . . . ) based on the information associated with the candidate group received from the electronic device 610. According to an embodiment, a user may be authenticated using user models, which at least partially match information associated with the candidate group, from among a lot of user models included in the external server, thereby improving the computing (or calculating) speed of the external server 620 (or the candidate group authentication module 622).

According to an embodiment, the reliability value generation module 623 may generate a reliability value to be provided to the electronic device 610, based on the similarity determined by the candidate group authentication module 622. Referring to FIG. 6, it is illustrated that the reliability value generation module 623 is separated from the candidate group authentication module 622. However, according to various embodiments, the candidate group authentication module 622 may include the reliability value generation module 623. Alternatively, according to various embodiments, the reliability value generation module 623 may be located in the electronic device 610 instead of the external server 620.

According to various embodiments, at least part of the configurations illustrated in FIG. 6 may be omitted, or two or more configurations may operate integrally. In addition, the configurations shown in FIG. 6 are illustrated for convenience of description, and thus are not interpreted as being limited to the above-described examples.

FIGS. 7A, 7B, 7C, 7D, 7E and 7F are diagrams illustrating example UIs displayed on a display of an electronic device according to various embodiments.

According to an embodiment, an electronic device (e.g., the user terminal 1100 of FIG. 1, the electronic device 401 of FIG. 4, the electronic device 500 of FIG. 5, or the electronic device 610 of FIG. 6) may communicate with an external electronic device. For example, the electronic device may make a voice call or a video call to an external electronic device.

Figure 7A:
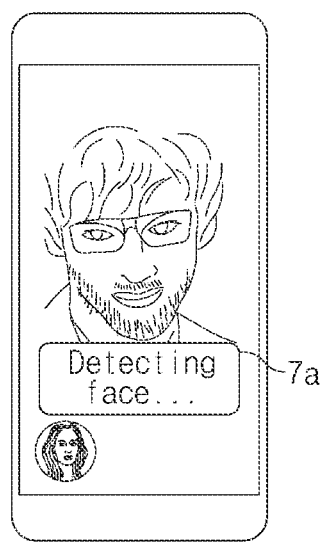
FIGS. 7A, 7B, 7C, 7D, 7E and 7F are diagrams illustrating example UIs displayed on a display of an electronic device according to various embodiments.
Figure 7B:
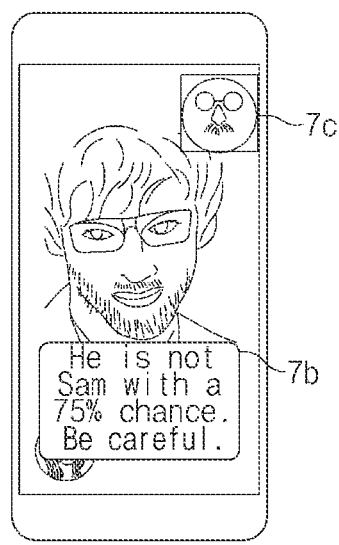
Figure 7C:
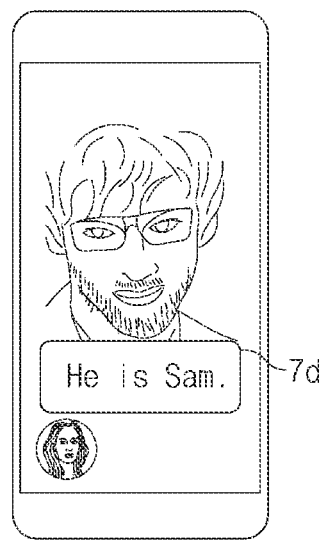

When a video call is connected between the electronic device according to an embodiment and the external electronic device, FIGS. 7A, 7B, and 7C illustrate example UIs displayed on a display.

According to an embodiment, while the video call is connected, the electronic device may obtain information (voice information, image information, or video information) associated with a user (e.g., a call receiver) of the external electronic device.

According to an embodiment, the electronic device may generate a candidate group including the first candidate and the second candidate, each of which is estimated as a call receiver, based on information stored in a contact application. For example, the electronic device may determine the first candidate corresponding to the information stored in the contact application that is at least partially matched with unique information of the external electronic device. For example, when a user of the external electronic device provides an utterance including "I am Sam" during a call, the electronic device may extract 'Sam' and then may determine a second candidate that at least partially matches 'Sam'.

According to an embodiment, the electronic device may provide the external server (e.g., the external server 620 in FIG. 6) with a public certificate included in the contact application, information (e.g., unique information and a name corresponding to each candidate) associated with the candidate group, and information (voice information, image information, or video information) associated with the user of the external electronic device obtained while a call is connected.

According to an embodiment, while the external server computes (or calculates or determines) a reliability value using a user model corresponding to the information associated with the candidate group after the external server successfully authenticates the user of the electronic device using the public certificate, the electronic device may display a (1-1)-th UI 7a on a display. For example, when the electronic device fails to receive the reliability value within a preset time, the electronic device may display the (1-1)-th UI 7a. The (1-1)-th UI 7a may include a "Detecting face" indicating that the external server is authenticating a candidate group, but is not limited to the illustrated example.

According to an embodiment, the electronic device may receive the reliability value from the external server. When the received reliability value is less than a predetermined threshold value, the electronic device may display the (2-1)-th UI 7b on the display. Because the user of the external electronic device during a call is not 'Sam', the (2-1)-th UI 7b may include "He is not Sam. Be careful." for urging the user's attention, but is not limited to the illustrated example. According to an embodiment, the (2-1)-th UI 7b may further include a reliability value (or a similarity value) inferred based on a user model. For example, the (2-1)-th UI 7b may include "He is not Sam with a 75% chance.". As another example, the electronic device may further display an icon 7c indicating voice information, image information, or video information, which is generated through an AI system, on the display.

According to an embodiment, when the received reliability value is not less than the predetermined threshold value, the electronic device may display the (3-1)-th UI 7d on the display. The (3-1)-th UI 7d may include "He is Sam" indicating that the user of the external electronic device during a call is the same as or corresponding to "Sam", but is not limited to the illustrated example. According to an embodiment, the (3-1)-th UI 7d may further include a reliability value (or a similarity value) inferred based on a user model. For example, the (3-1)-th UI 7d may include "He is Sam with a 95% chance." (not shown).

Figure 7D:
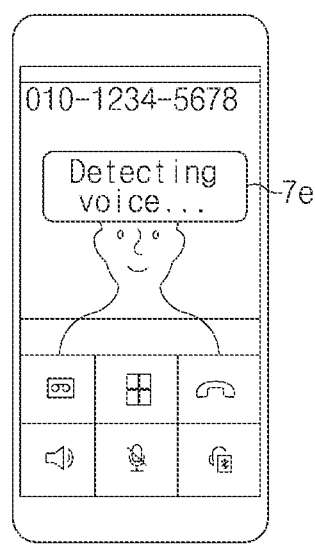
Figure 7E:
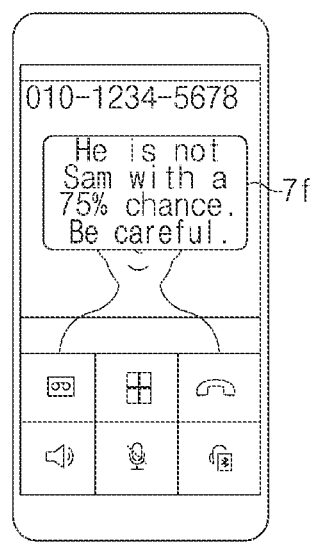
Figure 7F:
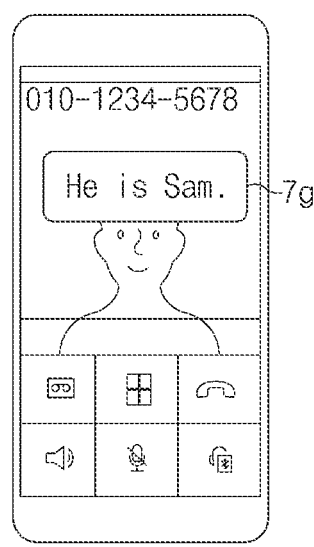

When a voice call is connected between an electronic device according to an embodiment and an external electronic device, FIGS. 7D, 7E, and 7F illustrate example UIs displayed on the display.

According to an embodiment, while the voice call is connected, the electronic device may obtain information associated with the user of the external electronic device. For example, the electronic device may obtain voice information provided during a call by the user of the external electronic device.

The electronic device according to the embodiment shown in FIGS. 7D, 7E, and 7F connects a voice call to the external electronic device. Accordingly, the descriptions given with reference to FIGS. 7D, 7E, and 7F is the same or similar to the descriptions described with reference to FIGS. 7A, 7B, and 7C, except that the electronic device according to an embodiment obtains voice information among information associated with the user of the external electronic device and the external server computes (or calculates or determines) a reliability value based on voice information.

For example, while the external server authenticates a candidate group, the electronic device may display a (1-2)-th UI 7e including "Detecting voice" on the display. For example, the electronic device may receive the reliability value inferred based on a user model from the external server. When the reliability value is less than the predetermined threshold value, the electronic device may display the (2-2)-th UI 7f on the display. The (2-2)-th UI 7f may further include the reliability value (or a similarity value). For example, the electronic device may receive the reliability value inferred based on the user model from the external server. When the reliability value is not less than the predetermined threshold value, the electronic device may display the (3-2)-th UI 7g on the display. The (3-2)-th UI 7g may further include the reliability value (or a similarity value) (not shown). The (1-2)-th UI 7e, the (2-2)-th UI 7f, and the (3-2)-th UI 7g are not limited to the illustrated example.

According to an example embodiment of the disclosure, an electronic device (e.g., the user terminal 1100 of FIG. 1, the user terminal 300 of FIG. 3, the electronic device 401 of FIG. 4, the electronic device 500 of FIG. 5, or the electronic device 610 of FIG. 6) may include: a display (e.g., the display 1140 of FIG. 1, the display module 460 of FIG. 4, or the display 540 of FIG. 5), a communication module comprising communication circuitry (e.g., the communication interface 1110 of FIG. 1, the communication module 490 of FIG. 4, or the communication module 510 of FIG. 5), a memory (e.g., the memory 1150 in FIG. 1 or the memory 400 in FIG. 4 or the memory 520 in FIG. 5), and a processor (e.g., the processor 1160 of FIG. 1 or the processor 420 of FIG. 4 or the processor 530 of FIG. 5) operatively connected to the display, the communication module, and the memory. According to an example embodiment, the memory may store instructions that, when executed, cause the processor to control the electronic device to: obtain unique information of an external electronic device and information associated with a user of the external electronic device through the communication module, generate a candidate group including at least one candidate based on the unique information and the information associated with the user of the external electronic device, provide an external server with at least part of the information associated with the user of the external electronic device and information associated with the candidate group, receive a reliability value indicating a degree of similarity between the information associated with the user of the external electronic device and the information associated with the candidate group, from the external server, and display a user interface (UI) indicating authentication based on the reliability value on the display.

According to an example embodiment, the instructions, when executed, may cause the processor to control the electronic device to obtain the information associated with the user of the external electronic device while a call between the electronic device and the external electronic device is connected.

According to an example embodiment, based on the call being a video call, the information associated with the user of the external electronic device may include at least one of voice information, image information, or video information of the user of the external electronic device.

According to an example embodiment, based on the call being a voice call, the information associated with the user of the external electronic device may include voice information of the user of the external electronic device.

According to an example embodiment, the voice information of the user of the external electronic device may include a context. The instructions, when executed, may cause the processor to control the electronic device to generate the candidate group including the at least one candidate having information that at least partially matches the context.

According to an example embodiment, the instructions, when executed, may cause the processor to control the electronic device to: convert the voice information of the user of the external electronic device into text information, obtain a context included in the converted text information, and generate the candidate group including the at least one candidate having the unique information or information that at least partially matches the obtained context.

According to an example embodiment, the instructions, when executed, may cause the processor to control the electronic device to: select the at least one candidate at least partially matching one of the unique information or the information associated with the user of the external electronic device among information stored in a contact application included in the memory corresponding to the information stored in the contact application, and generate the candidate group including the selected at least one candidate.

According to an example embodiment, the instructions, when executed, may cause the processor to control the electronic device to: display a first UI indicating that the user of the external electronic device is being authenticated on the display based on not receiving the reliability value within a predetermined time.

According to an example embodiment, the instructions, when executed, may cause the processor to control the electronic device to: display a second UI indicating that the user of the external electronic device fails to be authenticated on the display based on the reliability value being less than a predetermined threshold value.

According to an example embodiment, the instructions, when executed, may cause the processor to control the electronic device to display a third UI indicating that the user of the external electronic device is successfully authenticated on the display based on the reliability value not being less than a predetermined threshold value.

Figure 8:
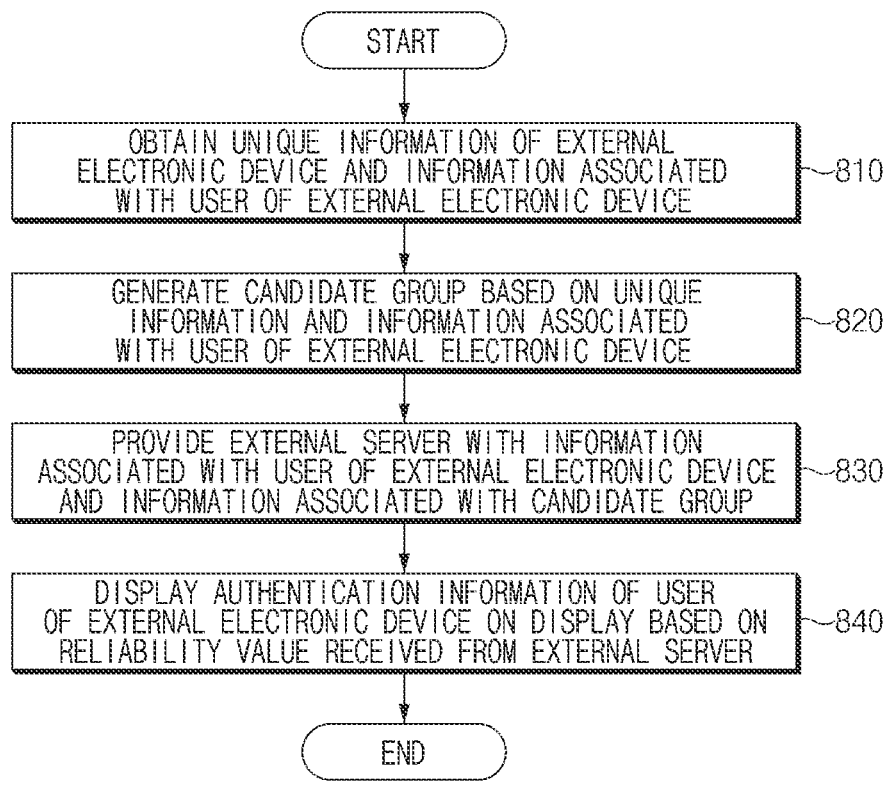
FIG. 8 is a flowchart illustrating an example method of operating an electronic device according to various embodiments.

FIG. 8 is a flowchart illustrating an example method of operating an electronic device according to various embodiments.

According to an embodiment, in operation 810, an electronic device (e.g., the user terminal 1100 of FIG. 1, the user terminal 300 of FIG. 3, the electronic device 401 of FIG. 4, the electronic device 500 of FIG. 5, or the electronic device 610 of FIG. 6) may obtain unique information of an external electronic device and information associated with a user of the external electronic device. For example, the electronic device according to an embodiment may make a call to an external electronic device through a communication module. For example, the call may include at least one of a voice call or a video call. For example, the user of the external electronic device may include a call receiver that makes a call to the user of the electronic device according to an embodiment. For example, the unique information of the external electronic device may include a phone number. For example, the information associated with the user of the external electronic device may include at least one of voice information, image information, or video information.

According to an embodiment, in operation 820, the electronic device may generate a candidate group including at least one candidate estimated as the user of the external electronic device, based on the unique information of the external electronic device and the information associated with the user of the external electronic device. For example, the electronic device may compare the unique information of the external electronic device with information stored in a contact application, and then may determine a first candidate corresponding to the information stored in the contact application that is at least partially matched with the unique information of the external electronic device. For example, the electronic device may determine a second candidate corresponding to the information stored in the contact application that is at least partially matched with the unique information of the external electronic device, based on voice information provided by the user of the external electronic device. For example, the electronic device may extract a context from the voice information (e.g., an utterance) provided by the user of the external electronic device, may compare the extracted context with information stored in the contact application, and may determine the second candidate corresponding to the information stored in the contact application that is at least partially matched with the unique information of the external electronic device. According to an embodiment, the electronic device may generate a candidate group including the first candidate and the second candidate.

According to an embodiment, in operation 830, the electronic device may provide the external server with information associated with the user of the external electronic device and information associated with a candidate group. For example, the information associated with the user of the external electronic device may include at least part of voice information, image information, or video information obtained during a call by the electronic device. For example, assuming that the call is a voice call, the electronic device according to an embodiment may obtain voice information provided by the user of the external electronic device. For example, assuming that the call is a video call, the electronic device according to an embodiment may obtain at least one of voice information, image information, or video information provided by the user of an external electronic device. For example, the information associated with the candidate group may include unique information or a name of each candidate included in the candidate group generated in operation 820. For example, the electronic device may provide an external server with the name and unique information, each of which corresponds to the first candidate, the name and unique information, each of which corresponds to the second candidate, from among the information stored in the contact application. According to an embodiment, the electronic device may provide the external server with a public certificate included in the contact application.

According to an embodiment, in operation 840, the electronic device may display authentication information of the user of the external electronic device on a display, based on a reliability value received from the external server. For example, the external server may authenticate a user of an electronic device using a public certificate provided by the electronic device according to an embodiment. According to an embodiment, the external server may select a user model corresponding to a candidate group using information associated with the candidate group. The external server may compute (or calculate or determine) a similarity of information associated with the user of the external electronic device using the selected user model, and may provide the electronic device with a reliability value corresponding to the similarity. For example, as the similarity is high, the reliability value may be great. According to an embodiment, when the reliability value received from the external server is less than a predetermined threshold value, the electronic device may display, on the display, a user's authentication information indicating that the user of the external electronic device is not an authentic user. According to an embodiment, when the reliability value received from the external server is not less than the predetermined threshold value, the electronic device may display, on the display, the user's authentication information indicating that the user of the external electronic device is estimated as the authentic user. For example, the user's authentication information may be displayed on the display of the electronic device through an UI.

Figure 9:
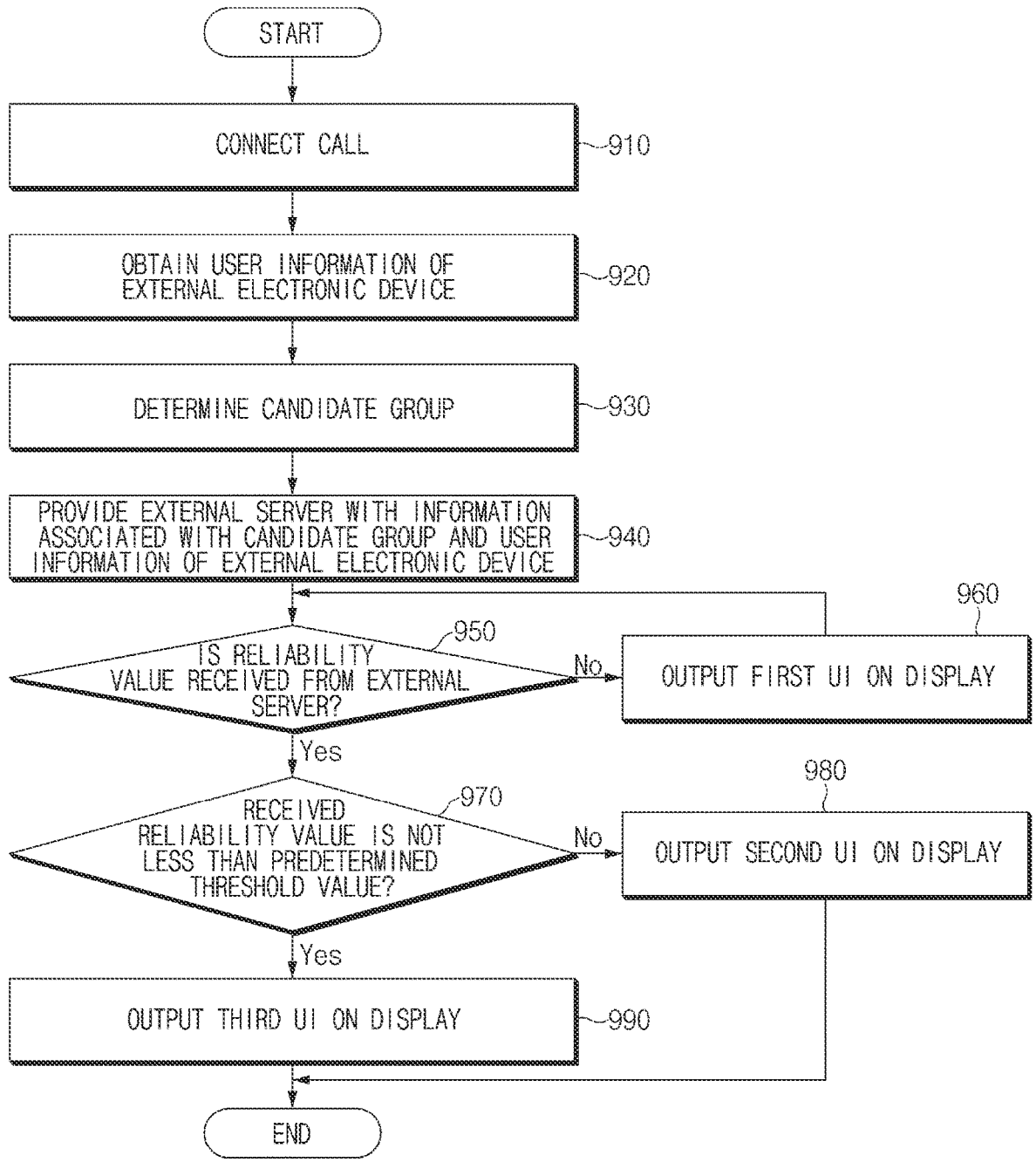
FIG. 9 is a flowchart illustrating an example method of operating an electronic device according to various embodiments.

FIG. 9 is a flowchart illustrating an example method of operating an electronic device according to various embodiments.

According to an embodiment, in operation 910, an electronic device may connect a call to an external electronic device. For example, the call may include at least one of a voice call or a video call.

According to an embodiment, in operation 920, the electronic device may obtain user information of the external electronic device. For example, the user information of the external electronic device may include at least part of voice information, image information, or video information of the user of the external electronic device. Besides, the user information of the external electronic device may include unique information (e.g., a phone number) of the external electronic device.

According to an embodiment, in operation 930, the electronic device may determine a candidate group including at least one call receiver candidate. For example, the electronic device may determine a call receiver candidate that at least partially matches the user information of the external electronic device based on a contact application. For example, the electronic device may determine a first candidate corresponding to the information stored in the contact application that is at least partially matched with the unique information of the external electronic device obtained in operation 920, and may determine a second candidate corresponding to the information stored in the contact application that is at least partially matched with a context extracted from the user's utterance content of the external electronic device. For example, the electronic device may determine a candidate group including the determined first candidate and the determined second candidate.

According to an embodiment, in operation 940, the electronic device may provide an external server with information associated with the candidate group and user information of the external electronic device. For example, an electronic device may further provide the external server with a public certificate included in the contact application. For example, the information associated with a candidate group may include at least one of unique information or a name stored in the contact application of the electronic device. For example, the user information of the external electronic device may include at least one of voice information, image information, or video information. According to an embodiment, the electronic device may provide the external server with a part of the user information of the external electronic device. For example, an electronic device may provide the external server with only a part of voice information (e.g., an utterance) provided by the user of the external electronic device.

According to an embodiment, in operation 950, the electronic device may determine whether a reliability value is received from the external server. According to an embodiment, when the electronic device does not receive the reliability value ("No" in operation 950), the electronic device may perform operation 960. When the electronic device receives the reliability value ("Yes" in operation 950), the electronic device may perform operation 970.

According to an embodiment, in operation 960, the electronic device may display a first UI on the display. For example, the first UI may include one of the (1-1)-th UI 7a illustrated in FIG. 7A or the (1-2)-th UI 7e illustrated in FIG. 7D. For example, the first UI may indicate that the external server is authenticating a call receiver. According to an embodiment, when the electronic device does not receive the reliability value within a predetermined time, the electronic device may display the first UI on the display.

According to an embodiment, in operation 970, the electronic device may determine whether the reliability value received from the external server is not less than a predetermined threshold value. According to an embodiment, when the reliability value received from the external server is less than the predetermined threshold value ("No" in operation 970), the electronic device may perform operation 980. When the reliability value received from the external server is not less than the predetermined threshold value ("Yes" in operation 970), the electronic device may perform operation 990.

According to an embodiment, in operation 980, the electronic device may display the second UI on the display. For example, the second UI may include one of the (2-1)-th UI 7b illustrated in FIG. 7B or the (2-2)-th UI 7f illustrated in FIG. 7E. For example, the second UI may illustrate that a result, in which the external server authenticates the call receiver, indicates that authentication fails. For example, the failure of authentication may indicate that the call receiver is not an authentic user.

According to an embodiment, in operation 990, the electronic device may display a third UI on the display. For example, the third UI may include one of the (3-1)-th UI 7d illustrated in FIG. 7C or the (3-2)-th UI 7g illustrated in FIG. 7F. For example, the third UI may illustrate that a result, in which the external server authenticates the call receiver, indicates that authentication succeeds. For example, the success of authentication may indicate that the call receiver is an authentic user.

According to an embodiment of the disclosure, an example method of operating an electronic device (e.g., the user terminal 1100 of FIG. 1, the user terminal 300 of FIG. 3, the electronic device 401 of FIG. 4, the electronic device 500 of FIG. 5, or the electronic device 610 of FIG. 6) may include: obtaining unique information of an external electronic device and information associated with a user of the external electronic device through a communication module, generating a candidate group including at least one candidate based on the unique information and the information associated with the user of the external electronic device, providing an external server (e.g., the external server 620 in FIG. 6) with at least part of the information associated with the user of the external electronic device and information associated with the candidate group, receiving a reliability value indicating a degree of similarity between the information associated with the user of the external electronic device and the information associated with the candidate group from the external server, and displaying a UI indicating authentication for the user of the external electronic device based on the reliability value on the display.

According to an example embodiment, the obtaining of the unique information may be performed while a call between the electronic device and the external electronic device is connected.

According to an example embodiment, based on the call being a video call, the information associated with the user of the external electronic device may include at least one of voice information, image information, or video information of the user of the external electronic device.

According to an example embodiment, based on the call being a voice call, the information associated with the user of the external electronic device may include voice information of the user of the external electronic device.

According to an example embodiment, the generating of the candidate group may include generating the candidate group including the at least one candidate having information that at least partially matches a context included in the voice information.

According to an example embodiment, the generating of the candidate group may include converting the voice information of the user of the external electronic device into text information, obtaining a context included in the converted text information, and generating the candidate group including the at least one candidate having the unique information or information that at least partially matches the obtained context.

According to an example embodiment, the generating of the candidate group at least partially may include selecting the at least one candidate, which at least partially matches one of the unique information or the information associated with the user of the external electronic device among information stored in a contact application included in a memory and which corresponds to the information stored in the contact application.

According to an example embodiment, the displaying of the UI may include displaying a first UI indicating that the user of the external electronic device is being authenticated, on the display, based on not receiving the reliability value within a predetermined time.

According to an example embodiment, the displaying of the UI may include displaying a second UI indicating that the user of the external electronic device fails to be authenticated, on the display, based on the reliability value being less than a predetermined threshold value.

According to an example embodiment, the displaying of the UI may include displaying a third UI indicating that the user of the external electronic device is successfully authenticated, on the display, based on the reliability value not being less than a predetermined threshold value.

The electronic device according to various example embodiments may be one of various types of electronic devices. The electronic devices may include, for example, a portable communication device (e.g., a smartphone), a computer device, a portable multimedia device, a portable medical device, a camera, a wearable device, a home appliance, or the like. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used in various embodiments of the disclosure, the term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 440) including one or more instructions that are stored in a storage medium (e.g., an internal memory 436 or an external memory 438) that is readable by a machine (e.g., the electronic device 401). For example, a processor (e.g., the processor 420) of the machine (e.g., the electronic device 401) may invoke at least one of the one or more instructions stored in the storage medium, and execute it. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the "non-transitory" storage medium is a tangible device, and may not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities and some of the plurality entities may be separately disposed in another component. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents.

What is claimed is:

1. An electronic device comprising:
a display;
a communication module comprising communication circuitry;
a memory; and
a processor operatively connected to the display, the communication module, and the memory,
wherein the memory stores instructions that, when executed, cause the processor to control the electronic device to:
obtain unique information of an external electronic device and information associated with a user of the external electronic device through the communication module;
generate a candidate group including at least one candidate based on the unique information and the information associated with the user of the external electronic device;
provide an external server with at least part of the information associated with the user of the external electronic device and information associated with the candidate group;
receive a reliability value indicating a degree of similarity between the information associated with the user of the external electronic device and the information associated with the candidate group, from the external server; and
display a user interface (UI) indicating authentication for the user of the external electronic device based on the reliability value on the display.

2. The electronic device of claim 1, wherein the instructions, when executed, cause the processor to control the electronic device to:
while a call between the electronic device and the external electronic device is connected, obtain the information associated with the user of the external electronic device.

3. The electronic device of claim 2, wherein, based on the call being a video call, the information associated with the user of the external electronic device includes at least one of voice information, image information, or video information of the user of the external electronic device.

4. The electronic device of claim 2, wherein, based on the call being a voice call, the information associated with the user of the external electronic device includes voice information of the user of the external electronic device.

5. The electronic device of claim 4, wherein the voice information of the user of the external electronic device includes a context, and
wherein the instructions, when executed, cause the processor to control the electronic device to:
generate the candidate group including the at least one candidate having information that at least partially matches the context.

6. The electronic device of claim 4, wherein the instructions, when executed, cause the processor to control the electronic device to:
convert the voice information of the user of the external electronic device into text information;
obtain a context included in the converted text information; and
generate the candidate group including the at least one candidate having the unique information or information that at least partially matches the obtained context.

7. The electronic device of claim 1, wherein the instructions, when executed, cause the processor to control the electronic device to:
select the at least one candidate at least partially matching one of the unique information or the information associated with the user of the external electronic device among information stored in a contact application included in the memory and corresponding to the information stored in the contact application; and
generate the candidate group including the selected at least one candidate.

8. The electronic device of claim 1, wherein the instructions, when executed, cause the processor to control the electronic device to:
based on not receiving the reliability value within a predetermined time, display a first UI indicating that the user of the external electronic device is being authenticated, on the display.

9. The electronic device of claim 1, wherein the instructions, when executed, cause the processor to control the electronic device to:
based on the reliability value being less than a predetermined threshold value, display a second UI indicating that the user of the external electronic device fails to be authenticated, on the display.

10. The electronic device of claim 1, wherein the instructions, when executed, cause the processor to control the electronic device to:
based on the reliability value not being less than a predetermined threshold value, display a third UI indicating that the user of the external electronic device is successfully authenticated, on the display.

11. A method of operating an electronic device, the method comprising:
obtaining unique information of an external electronic device and information associated with a user of the external electronic device through a communication module;
generating a candidate group including at least one candidate based on the unique information and the information associated with the user of the external electronic device;
providing an external server with at least part of the information associated with the user of the external electronic device and information associated with the candidate group;
receiving a reliability value indicating a degree of similarity between the information associated with the user of the external electronic device and the information associated with the candidate group, from the external server; and
displaying a UI indicating authentication for the user of the external electronic device based on the reliability value on a display.

12. The method of claim 11, wherein the obtaining of the unique information is performed while a call between the electronic device and the external electronic device is connected.

13. The method of claim 12, wherein, based on the call being a video call, the information associated with the user of the external electronic device includes at least one of voice information, image information, or video information of the user of the external electronic device.

14. The method of claim 12, wherein, based on the call being a voice call, the information associated with the user of the external electronic device includes voice information of the user of the external electronic device.

15. The method of claim 14, wherein the generating of the candidate group includes:
generating the candidate group including the at least one candidate having information at least partially matching a context included in the voice information.

16. The method of claim 14, wherein the generating of the candidate group includes:
converting the voice information of the user of the external electronic device into text information;
obtaining a context included in the converted text information; and
generating the candidate group including the at least one candidate having the unique information or information at least partially matching the obtained context.

17. The method of claim 11, wherein the generating of the candidate group comprises:
selecting the at least one candidate, at least partially matching one of the unique information or the information associated with the user of the external electronic device among information stored in a contact application included in a memory and corresponding to the information stored in the contact application.

18. The method of claim 11, wherein the displaying of the UI includes:
based on not receiving the reliability value within a predetermined time, displaying a first UI indicating that the user of the external electronic device is being authenticated, on the display.

19. The method of claim 11, wherein the displaying of the UI includes:
based on the reliability value being less than a predetermined threshold value, displaying a second UI indicating that the user of the external electronic device fails to be authenticated, on the display.

20. The method of claim 11, wherein the displaying of the UI includes:
based on the reliability value not being less than a predetermined threshold value, displaying a third UI indicating that the user of the external electronic device is successfully authenticated, on the display.

* * * * *